(12) United States Patent
Saint et al.

(10) Patent No.: US 12,021,850 B2
(45) Date of Patent: *Jun. 25, 2024

(54) EFFICIENT METHODS FOR AUTHENTICATED COMMUNICATION

(71) Applicant: VISA INTERNATIONAL SERVICE ASSOCIATION, San Francisco, CA (US)

(72) Inventors: Eric Le Saint, Los Altos, CA (US); Upendra Mardikar, San Jose, CA (US); Dominique Fedronic, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,917

(22) Filed: Jul. 8, 2022

(65) Prior Publication Data

US 2022/0353252 A1 Nov. 3, 2022

Related U.S. Application Data

(63) Continuation of application No. 16/694,668, filed on Nov. 25, 2019, now Pat. No. 11,394,697, which is a
(Continued)

(51) Int. Cl.
*G06Q 20/38* (2012.01)
*G06Q 20/32* (2012.01)
(Continued)

(52) U.S. Cl.
CPC ..... *H04L 63/0442* (2013.01); *G06Q 20/3227* (2013.01); *G06Q 20/3829* (2013.01);
(Continued)

(58) Field of Classification Search
CPC .................................................. G06Q 20/0442
(Continued)

(56) References Cited

U.S. PATENT DOCUMENTS

| 6,453,159 B1 | 9/2002 | Lewis |
| 7,254,232 B2 | 8/2007 | DiSanto et al. |

(Continued)

FOREIGN PATENT DOCUMENTS

| AU | 2015277000 | 11/2019 |
| CN | 102077213 | 5/2011 |

(Continued)

OTHER PUBLICATIONS

"Tomorrow's Transactions", HCE and BLE University, London, Consult Hyperion, Available Online at: http://tomorrowstransactions.com, Mar. 20, 2014, 18 pages.
(Continued)

*Primary Examiner* — Chinedu C Agwumezie
(74) *Attorney, Agent, or Firm* — Kilpatrick Townsend & Stockton LLP

(57) ABSTRACT

Embodiments of the invention relate to efficient methods for authenticated communication. In one embodiment, a first computing device can generate a key pair comprising a public key and a private key. The first computing device can generate a first shared secret using the private key and a static second device public key. The first computing device can encrypt request data using the first shared secret to obtain encrypted request data. The first computing device can send a request message including the encrypted request data and the public key to a server computer. Upon receiving a response message from the server computer, the first computing device can determine a second shared secret using the private key and the blinded static second device public key. The first computing device can then decrypt the
(Continued)

encrypted response data from the response message to obtain response data.

17 Claims, 18 Drawing Sheets

Related U.S. Application Data continuation of application No. 14/743,874, filed on Jun. 18, 2015, now Pat. No. 10,574,633.

(60) Provisional application No. 62/016,048, filed on Jun. 23, 2014, provisional application No. 62/014,102, filed on Jun. 18, 2014.

(51) Int. Cl.
*H04L 9/08* (2006.01)
*H04L 9/32* (2006.01)
*H04L 9/40* (2022.01)

(52) U.S. Cl.
CPC .......... *H04L 9/0841* (2013.01); *H04L 9/3228* (2013.01); *H04L 63/0428* (2013.01); *H04L 63/068* (2013.01); *H04L 63/0823* (2013.01); *H04L 2209/04* (2013.01); *H04L 2463/061* (2013.01)

(58) Field of Classification Search
USPC ........................................................ 705/76
See application file for complete search history.

(56) References Cited

U.S. PATENT DOCUMENTS

| | | | |
|---|---|---|---|
| 7,627,760 | B2 | 12/2009 | Lauter et al. |
| 7,707,420 | B1 | 4/2010 | Little |
| H2270 | H | 6/2012 | Le Saint et al. |
| 8,200,974 | B1 | 6/2012 | DiSanto et al. |
| 8,533,471 | B2 | 9/2013 | Falk et al. |
| 10,574,633 | B2 | 2/2020 | Le Saint et al. |
| 2005/0066175 | A1 | 3/2005 | Perlman |
| 2005/0084114 | A1 | 4/2005 | Jung et al. |
| 2005/0149732 | A1* | 7/2005 | Freeman ................. H04L 67/02 713/171 |
| 2006/0179319 | A1* | 8/2006 | Krawczyk ............. H04L 9/0643 713/180 |
| 2006/0265595 | A1 | 11/2006 | Scottodiluzio |
| 2007/0028090 | A1 | 2/2007 | Lopez et al. |
| 2007/0033403 | A1 | 2/2007 | Lauter et al. |
| 2007/0288743 | A1 | 12/2007 | Cam-Winget et al. |
| 2008/0040603 | A1 | 2/2008 | Stedron |
| 2008/0133918 | A1 | 6/2008 | You et al. |
| 2008/0246338 | A1 | 10/2008 | Donnelly et al. |
| 2009/0318114 | A1 | 12/2009 | Bertoni |
| 2011/0208970 | A1 | 8/2011 | Brown et al. |
| 2011/0307698 | A1 | 12/2011 | Vanstone |
| 2012/0082312 | A1 | 4/2012 | Liu et al. |
| 2012/0087493 | A1 | 4/2012 | Chidambaram et al. |
| 2012/0137132 | A1 | 5/2012 | Le Saint |
| 2012/0221858 | A1* | 8/2012 | Struik .................. H04L 9/0844 713/171 |
| 2012/0314865 | A1 | 12/2012 | Kitchen |
| 2013/0016831 | A1 | 1/2013 | Lambert et al. |
| 2013/0091353 | A1 | 4/2013 | Zhang et al. |
| 2013/0195271 | A1 | 8/2013 | Miyabayashi et al. |
| 2013/0219189 | A1 | 8/2013 | Simmons |
| 2013/0243194 | A1 | 9/2013 | Hawkes et al. |
| 2013/0301828 | A1 | 11/2013 | Gouget et al. |
| 2013/0332739 | A1 | 12/2013 | Yi et al. |
| 2014/0003604 | A1 | 1/2014 | Campagna et al. |
| 2014/0013121 | A1 | 1/2014 | Sherkin et al. |
| 2014/0208117 | A1 | 7/2014 | Hayashi et al. |
| 2014/0281542 | A1 | 9/2014 | Bono et al. |
| 2014/0365776 | A1* | 12/2014 | Smets .................. G06Q 20/401 713/171 |
| 2015/0019443 | A1 | 1/2015 | Sheets et al. |
| 2015/0200774 | A1 | 7/2015 | Le Saint |
| 2015/0213433 | A1* | 7/2015 | Khan .................. G06Q 20/3829 705/71 |
| 2015/0372811 | A1 | 12/2015 | Le Saint et al. |
| 2016/0065370 | A1 | 3/2016 | Le Saint et al. |

FOREIGN PATENT DOCUMENTS

| | | |
|---|---|---|
| CN | 103546289 | 1/2014 |
| CN | 103701596 | 4/2014 |
| CN | 103797830 | 5/2014 |
| CN | 106664206 | 5/2017 |
| EP | 1063813 | 12/2000 |
| EP | 3158680 | 4/2017 |
| KR | 1020080074956 | 8/2008 |
| WO | 2013023968 | 2/2013 |
| WO | 2014109283 | 7/2014 |
| WO | 2015195978 | 12/2015 |
| WO | 2016033610 | 3/2016 |

OTHER PUBLICATIONS

"U.S. Appl. No. 62/014,102", Efficient Methods for Authenticated Communication, Jun. 18, 2014, 115 pages.
"U.S. Appl. No. 62/016,048", Efficient Methods for Forward Secure Authenticatedcommunication, Jun. 23, 2014, 185 pages.
"U.S. Appl. No. 62/044,172", Methods for Secure Cryptogram Generation, Aug. 29, 2014, 119 pages.
AU2015277000 , "First Examination Report", dated Nov. 14, 2018, 3 pages.
AU2015277000 , "Notice of Acceptance", dated May 6, 2019, 3 pages.
AU2019216646 , "First Examination Report", dated Aug. 12, 2020, 4 pages.
Brzuska et al., "An Analysis of the EMV Channel Establishment Protocol", International Association For Cryptologic Research, vol. 20131105, No. 113226, Nov. 5, 2013, pp. 1-30.
Application No. CN201580032715.8 , Notice of Decision to Grant, dated Feb. 3, 2020, 4 pages.
Application No. CN201580032715.8 , Office Action, dated Aug. 20, 2019, 14 pages.
Application No. CN202010298355.9 , Office Action, dated Nov. 1, 2021, 10 pages.
Application No. CN202010298355.9 , Office Action, dated Jun. 14, 2022, 7 pages.
Application No. EP15810102.2 , Extended European Search Report, dated Jan. 9, 2018, 6 pages.
Application No. EP15810102.2 , Notice of Decision to Grant, dated Jan. 28, 2021, 2 pages.
Application No. EP15810102.2 , Office Action, dated Feb. 27, 2020, 5 pages.
Application No. EP16818857.1 , Extended European Search Report, dated May 14, 2018, 9 pages.
Application No. EP21158837.1 , Extended European Search Report, dated Jun. 8, 2021, 7 pages.
Garrett et al., "Blinded Diffie-Hellman Preventing Eavesdroppers from Tracking Payments", International Conference on Financial Cryptography and Data Security, Dec. 16, 2014, pp. 79-92.
Application No. PCT/US2015/036524 , International Search Report and Written Opinion, dated Sep. 30, 2015, 8 pages.
Application No. PCT/US2016/015218 , International Search Report and Written Opinion, dated May 12, 2016, 17 pages.
Application No. CN202010298355.9, Office Action, dated Oct. 8, 2022, 9 pages.
Application No. CN202010298355.9 , Office Action, Mailed On Apr. 9, 2024, 9 pages.

* cited by examiner

EFFICIENT METHODS FOR AUTHENTICATED COMMUNICATION

CROSS-REFERENCES TO RELATED APPLICATIONS

The present application is a continuation of U.S. patent application Ser. No. 16/694,668, filed Nov. 25, 2019, which is a continuation of U.S. patent application Ser. No. 14/743,874 filed Jun. 18, 2015, which is a non-provisional of and claims priority to U.S. Provisional Application No. 62/014,102, filed on Jun. 18, 2014, and U.S. Provisional Application No. 62/016,048, filed on Jun. 23, 2014, the entire contents of which are hereby incorporated by reference for all purposes.

BACKGROUND

As user devices such as NFC-enabled mobile phones and contactless cards continue to increase in popularity, maintaining the security of payment transactions continues to be a concern. For instance, in order to conduct a payment transaction, it is typically necessary to authenticate a user and transmit information to a server. However, an attacker may attempt to eavesdrop on the transaction (e.g., by conducting a man-in-the-middle attack). Thus, an attacker may attempt to intercept identification data, such as a user device identifier, or authentication data, such as a password, transmitted by the user. If determined, this data could be used for illicit purposes.

Further complicating matters is the security of the user device itself. In some cases, the user device may be compromised or otherwise untrustworthy, so that it would be inadvisable to store persistent or static secure credentials such as a user private key on the device. Conducting secure and authenticated communication in such circumstances may pose a challenge.

Additionally complicating matters is the unlikely event that a private key, such as a private key stored on a user device or a private key stored on a server computer, is compromised. In such circumstances, it is desirable for a secure system to exhibit forward secrecy: the compromise of the private key should not lead to the compromise of past secure communication between the entities.

Embodiments of the present invention address these and other problems individually and collectively.

BRIEF SUMMARY

Embodiments of the invention relate to efficient methods for authenticated communication.

In one embodiment, a first computing device can generate an ephemeral key pair comprising an ephemeral public key and an ephemeral private key. The first computing device can generate a first shared secret using the ephemeral private key and a static second device public key. The first computing device can encrypt request data using the first shared secret to obtain encrypted request data. The first computing device can send a request message including the encrypted request data and the ephemeral public key to a second computing device.

Upon receiving the request message, the second computing device can generate the first shared secret using the ephemeral public key and a static second device private key. The second computing device can decrypt the encrypted request data in the request message using the first shared secret to obtain request data. The second computing device can then generate a second shared secret using a blinded static second device private key and the ephemeral public key. The second computing device can encrypt response data using the second shared secret to determine encrypted response data. The second computing device can then send a response message including the encrypted response data and a blinded static second device public key to the first computing device.

Upon receiving the response message, the first computing device can determine a second shared secret using the ephemeral private key and the blinded static second device public key. The first computing device can then decrypt the encrypted response data from the response message to obtain response data.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

Figure 1:
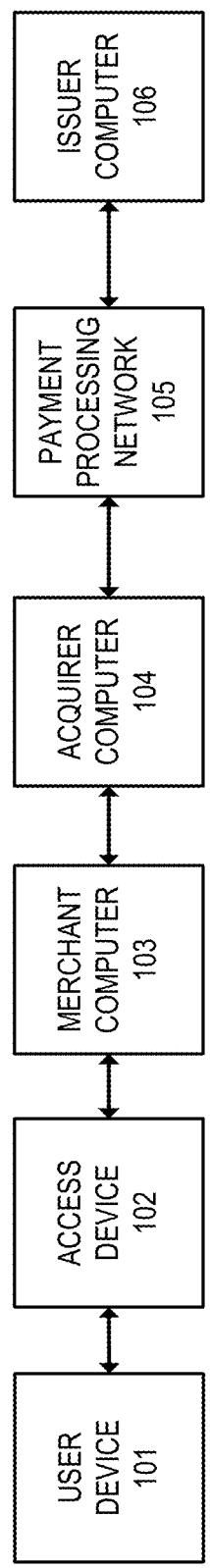
FIG. 1 shows a diagram of an exemplary system that may be used with embodiments of the invention.

Prior to discussing embodiments of the invention, description of some terms may be helpful in understanding embodiments.

The term "server computer" may include a computer or cluster of computing devices. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce. For example, in elliptic curve cryptography, a public key may be multiplied by the nonce to generate a "blinded public key." Similarly, a private key may be multiplied by the nonce to generate a "blinded private key."

An "ephemeral key pair" may include a public key (i.e., an "ephemeral public key") and a private key (i.e., an "ephemeral private key) generated for use with a single transaction or other communication session. The ephemeral key pair may be of any suitable format, such as ECC or RSA. Typically, an ephemeral key pair may is deleted once the transaction or communication session has concluded.

A "static key pair" may include a public key (i.e., a "static public key") and a private key (i.e., a "static private key") maintained over a period of time. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. In some cases, a shared secret may be used to generate a session key.

The term "identification data" may include any data or information associated with a user or device. Examples of identification data may include a name of a user associated with the device, an organization associated with the device, payment information such as a primary account number (PAN) associated with the device, an expiration date of the device, a certificate associated with the device, an IMEI or serial number of the device, etc.

The term "authentication data" may include any data or information suitable to authenticate a user or device. Examples of authentication data may include a password or passphrase, a secret key (e.g., a private key), etc.

An "identification factor" may include any data or information determined from identification data and/or authentication data. Typically, though not necessarily, the identification factor may be generated by hashing a combination of identification data and authentication data.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "session key" may include any key used to encrypt or decrypt data to be securely communicated. In some cases, a session key may be generated from a shared secret known both to a sending entity and a receiving entity. For example, the session key may be derived using a key derivation function and the shared secret.

DETAILED DESCRIPTION

Embodiments of the invention relate to efficient methods for authenticated communication. For example, a first computing device and a second computing device can mutually authenticate and exchange messages without exposing any sensitive information in cleartext.

In one embodiment, a first computing device can generate an ephemeral key pair comprising an ephemeral public key and an ephemeral private key. The first computing device can generate a first shared secret using the ephemeral private key and a static second device public key of a second computing device. The first computing device can encrypt request data using the first shared secret to obtain encrypted request data. The first computing device can send a request message including the encrypted request data and the ephemeral public key to the second computing device.

Upon receiving the request message, the second computing device can generate the first shared secret using the ephemeral public key and a static second device private key. The second computing device can decrypt the encrypted request data in the request message using the first shared secret to obtain request data. The second computing device can then generate a second shared secret using a blinded static second device private key and the ephemeral public key. The second computing device can encrypt response data using the second shared secret to determine encrypted response data. The second computing device can then send a response message including the encrypted response data and a blinded static second device public key to the first computing device.

Upon receiving the response message, the first computing device can determine a second shared secret using the ephemeral private key and the blinded static second device public key. The first computing device can then decrypt the encrypted response data from the response message to obtain response data.

In some embodiments, a first computing device can maintain a static first device private key and a static first device public key, and the ephemeral key pair may be an ephemeral first device key pair comprising an ephemeral first device public key and an ephemeral first device private key. In some such embodiments, the request data sent from the first device can include a first device certificate comprising the static first device public key, and the response message received from the second computing device may include an ephemeral second device public key. Accordingly, the first computing device can generate an auxiliary shared secret using the ephemeral second device public key and the static first device private key, and decrypt the encrypted response data using the auxiliary shared secret.

Embodiments of the invention can protect the identity of computing devices engaged in communication. For example, an attacker may attempt to snoop or otherwise monitor data communicated between a first computing device (e.g., a mobile device) and a second computing device (e.g., a server computer). Since embodiments of the invention can avoid transmitting any identifiable information (such as a static first device public key or a static second device public key) in cleartext, the identity of the computing devices are protected from unauthorized entities.

Embodiments can also achieve bi-directional, authenticated, and secure communication using only a single request message and a single response message. This allows fast authentication with reduced latency, and allows the integration of the security properties of embodiments into other existing request/response flows, without the need to transmit additional messages. For example, in some embodiments, the contents of a request message can be appended to a request message that may be sent for a different purpose (mutatis mutandis for a response message).

Some embodiments can further provide the property of forward secrecy: even if a static first device private key or a static second device private key are compromised, the shared secrets used to encrypt request data and response data cannot be re-generated after the communication session ends. For example, in some embodiments, a first computing device can generate a second session key using an ephemeral first device private key, a blinded static second device public key, a static first device private key, and an ephemeral second device public key. In such embodiments, even if the blinded static second device public key and the ephemeral second device public key are observed in transit by an eavesdropper, and the static first device private key is later compromised, the second session key cannot be re-generated by an attacker because the ephemeral first device private key would have already been deleted from the first computing device. Without the second session key, data encrypted using the second session key cannot be decrypted. Thus, such embodiments allow communication to remain secure even in the unlikely event of a later compromise of the first computing device.

In another example, a second computing device can generate a second session key using an ephemeral first device public key, a blinded static second device private key, a static first device public key, and an ephemeral second device private key. In such embodiments, even if the static first device public key and the ephemeral first device public key are observed in transit by an eavesdropper, and the static second device private key is later compromised, the second session key cannot be re-generated by an attacker because the ephemeral second device private key would have already been deleted from the second computing device. Without the second session key, data encrypted using the second session key cannot be decrypted. Thus, such embodiments allow communication to remain secure even in the unlikely event of a later compromise of the second computing device.

Thus, embodiments can allow for secure communication even if either end-point of the communication is compromised.

Furthermore, embodiments can provide faster and more efficient communication in the case of computing devices that have previously communicated. In some embodiments, a registry at a first computing device may be used to store a future shared secret and a future second device session identifier for one or more second computing devices. An analogous registry at a second computing device can be used to store future shared secret and future blinded static second device public key values for one or more first devices. Thus, if a first device and a second device communicate multiple times, the stored data may be used. This can avoid certain operations, such as the elliptic-curve Diffie-Hellman (ECDH) algorithm, that may be relatively time and computation intensive. This can also provide users of computing devices an improved experience, since the reduction in processing allowed by embodiments can improve battery life and reduce communication times. For example, in accordance with some embodiments, secure and private communication between two devices can be conducted in less than 50 ms.

Embodiments can also appear identical to systems that do not use blinded keys to eavesdroppers, since an eavesdropper would not know whether a public key transmitted from a first computing device to a second computing device or vice-versa was a blinded or an non-blinded public key. Thus, embodiments can provide protection against reverse engineering of the protocol.

I. Systems

A. Payment System

FIG. 1 shows a system according to an embodiment of the invention. The system comprises a user (not shown) who may operate a user device 101. The user may use user device 101 to conduct payment transactions in communication with an access device 102. As used herein, a "user device" may include a desktop computer, laptop computer, mobile phone, tablet, credit card, debit card, or any suitable computing device. As used herein, an "access device" may include any computing device, such as a point of sale (POS) terminal or web server, suitable to communicate with a user device. In some embodiments, access device 102 may directly communicate with user device 101. In other embodiments, access device 102 may communicate to user device 101 via an interface device, such as a smart watch, smart glasses, or any other suitable device. Access device 102 may be connected to merchant computer 103, which may be connected to acquirer computer 104. Acquirer computer 104 may be connected to issuer computer 106 via payment processing network 105. Any or all of devices 101-106 may be implemented using one or more computing devices such as server computers.

As used herein, an "issuer" may typically refer to a business entity (e.g., a bank) that maintains financial accounts for a user and often issues or provisions a user device 101, such as a credit or debit card, or mobile device, to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., access device 102, merchant computer 103, acquirer computer 104, payment processing network 105, and issuer computer 106) to enable communications, or to perform one or more of the functions described herein.

The payment processing network 105 may include data processing subsystems, networks, and operations used to support and deliver certificate authority services, authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 105 may use any suitable wired or wireless network, including the Internet.

In some payment transactions, the user purchases a good or service at a merchant using a user device 101. User device 101 can interact with an access device 102 at a merchant associated with merchant computer 103. For example, the user may tap user device 101 against an NFC reader in the access device 102. Alternatively, the user may indicate payment details to the merchant over a computer network, such as in an online or e-commerce transaction.

An authorization request message for a transaction may be generated by access device 102 or merchant computer 103 and then forwarded to the acquirer computer 104. After receiving the authorization request message, the acquirer computer 104 sends the authorization request message to the payment processing network 105. The payment processing network 105 then forwards the authorization request message to the corresponding issuer computer 106 associated with an issuer associated with the user or user device 101.

An "authorization request message" may be an electronic message that is sent to a payment processing network and/or an issuer to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 106 receives the authorization request message, the issuer computer 106 sends an authorization response message back to the payment processing network 105 to indicate whether the current transaction is authorized (or not authorized). The payment processing network 105 then forwards the authorization response message back to the acquirer computer 104. In some embodiments, payment processing network 105 may decline the transaction even if issuer computer 106 has authorized the transaction, for example depending on a value of the fraud risk score. The acquirer computer 104 then sends the response message back to the merchant computer 103.

An "authorization response message" may be an electronic message reply to an authorization request message generated by an issuer computer 106 and/or a payment processing network 105. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an issuer returns in response to an authorization request message in an electronic message (either directly or through the payment processing network 105) to the merchant computer 103 that indicates approval of the transaction. The code may serve as proof of authorization. As noted above, in some embodiments, a payment processing network 105 may generate or forward the authorization response message to the merchant, typically via acquirer computer 104.

After the merchant computer 103 receives the authorization response message, the merchant computer 103 may then provide the authorization response message for the user. The response message may be displayed by the access device 102, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 105. A clearing process is a process of exchanging financial details between an acquirer and an issuer to facilitate posting to a customer's payment account and reconciliation of the user's settlement position.

B. Computing Device

Figure 2:
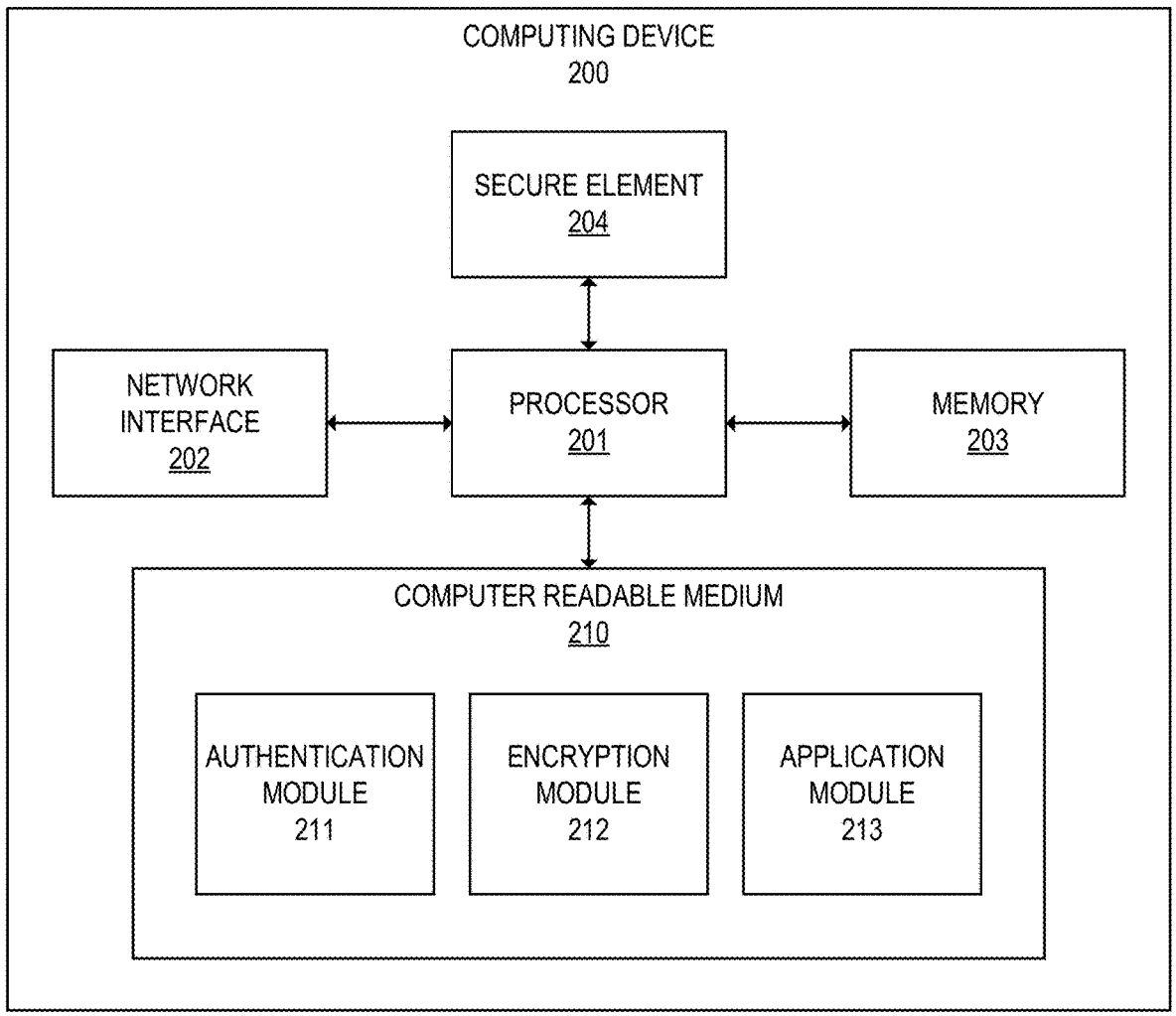
FIG. 2 shows an example of a computing device in accordance with some embodiments.

FIG. 2 shows an example of a computing device 200 in accordance with some embodiments. Examples of computing devices 200 may include mobile phones, tablets, desktop and laptop computers, wearable devices (e.g., smart watches, fitness bands, ankle bracelets, rings, earrings, etc.), server computers, or any other computing device suitable for receiving, storing, and transmitting data. Computing device 200 may include a processor 201 communicatively coupled to a network interface 202, a memory 203, and a computer readable medium 210.

The processor 201 can comprise one or more CPUs, each of which may comprise at least one processor cores operable to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. In some cases, processor 201 can include multiple CPUs coupled over a network, such as in a distributed or cluster computing system.

The network interface 202 may be configured to allow computing device 200 to communicate with other entities such devices 101-106, other computing devices, etc. using one or more communications networks. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); a secured custom connection; a Wide Area Network (WAN); a wireless network (e.g., employing protocols such as, but not limited to a Wireless Application Protocol (WAP), I-mode, and/or the like); and/or the like.

The memory 203 may be used to store data and code. The memory 203 may be coupled to the processor 201 internally or externally (e.g., cloud based data storage), and may comprise any combination of volatile and/or non-volatile memory, such as RAM, DRAM, ROM, flash, or any other suitable memory device.

The computer-readable medium 210 may be in the form of a memory (e.g., flash, ROM, etc.) and may comprise code, executable by the processor 201 for implementing the methods described herein. The computer readable medium 210 may include an authentication module 211, an encryption module 212, and an application module 213.

Authentication module 211 may include any program, software, or other code suitable to authenticate computing device 200 to another computing device, or authenticate another computing device at computing device 200. For example, authentication module 211 may be configured to generate and send an authentication request message to another computing device, and receive and process an authentication response message from the other computing devices. Similarly, authentication module 211 may be configured to receive and process an authentication request message from another computing device, and generate and send an authentication response message to the other computing device. In various embodiments, authentication module 211 may be configured to perform some or all of methods 400, 600, 1000, 1200, 1600, or 1700 of FIGS. 4, 6, 10, 12, 16, and 17, respectively.

Encryption module 212 may include any program, software, or other code suitable to perform operations related to encryption. For example encryption module may be configured to generate a shared secret, such as using a key agreement protocol such as Diffie-Hellman. Encryption module 212 may be further configured to derive a session key from a shared secret, such as using a key derivation function (KDF). In some embodiments, encryption module 212 may be configured to store one or more static keys, such as a static first device private key or a static second device private key. In some embodiments, encryption module 212 may be implemented using any combination of software (such as host card emulation or HCE) and hardware (such as a hardware security module or HSM).

Application module 213 may include any program, software, or other code suitable to run one or more applications. For example, application module 213 may include a payment application operable to conduct a payment transaction. In some embodiments, the payment application may be configured to allow a user to select goods and services to be purchased, obtain secure credentials (e.g., a cryptogram key) from an issuer of a payment account, and/or initiate or conduct a payment transaction (e.g., using the secure credentials). Application module 313 may include a payment application service operable to service payment applications at one or more computing devices. In some embodiments, the payment application service may be configured to allow a user to select goods and services to be purchased, provide secure credentials (e.g., a cryptogram key) to a computing device, and/or initiate or conduct a payment transaction.

II. Authenticated Communication Methods

Embodiments can use the systems and apparatuses described above to conduct methods for authenticated communication. FIGS. 3-7 describe some such methods.

Figure 3:
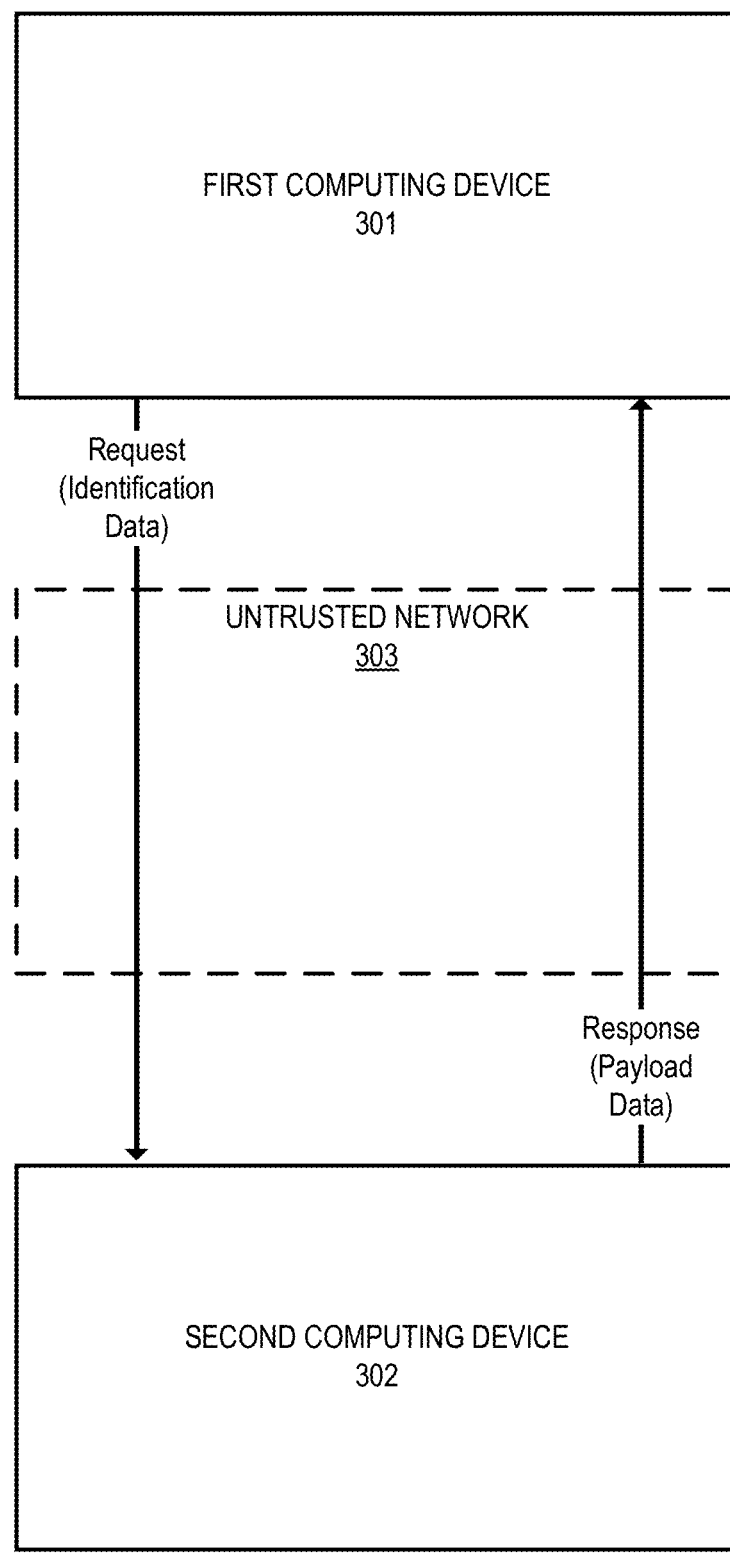
FIG. 3 shows a flow diagram illustrating communication between a first computing device and a second computing device in accordance with some embodiments.

FIG. 3 shows a simplified flow diagram illustrating communication between a first computing device 301 and a second computing device 302 in accordance with some embodiments. Computing devices 301 and 302 may, in some embodiments, be implemented in accordance with computing device 200 of FIG. 2. As shown in FIG. 3, first computing device 301 may transmit to second computing device 302 a request message generated using identification data. Typically, the identification data is encrypted or otherwise protected. In some embodiments, the request message may pass through an untrusted network 303. Second computing device 302 can process the request message to obtain and verify the identification data. Second computing device 302 can then encrypt payload data and transmit the encrypted payload data to first computing device 301 in a response message. First computing device 301 can then process the response message to obtain the payload data.

Second computing device 302 can maintain a static second device key pair comprising a static second device public key and a static second device private key. Similarly, first computing device 301 can maintain a static first device key pair comprising a static first device public key and a static first device private key. In addition, first computing device 301 and/or second computing device 302 can generate an ephemeral key pair (i.e., an ephemeral first device key pair or an ephemeral second device key pair, respectively). One or more of these keys can be used to encrypt or decrypt the request message and/or the response message.

In various embodiments, either or computing devices 301 and 302 may be a part of any one of devices, networks, or computers 101-105. For example, in some embodiments, first computing device 301 may be a user device 101, and second computing device 302 may be an access device 102 or server computer. In such embodiments, when a user conducts a transaction, first computing device 301 communicates with second computing device 302. In various embodiments, the communication may be in accordance with methods 400, 600, 1000, 1200, 1600, or 1700 of FIGS. 4, 6, 10, 12, 16, and 17, respectively.

A. First Computing Device

Figure 4:
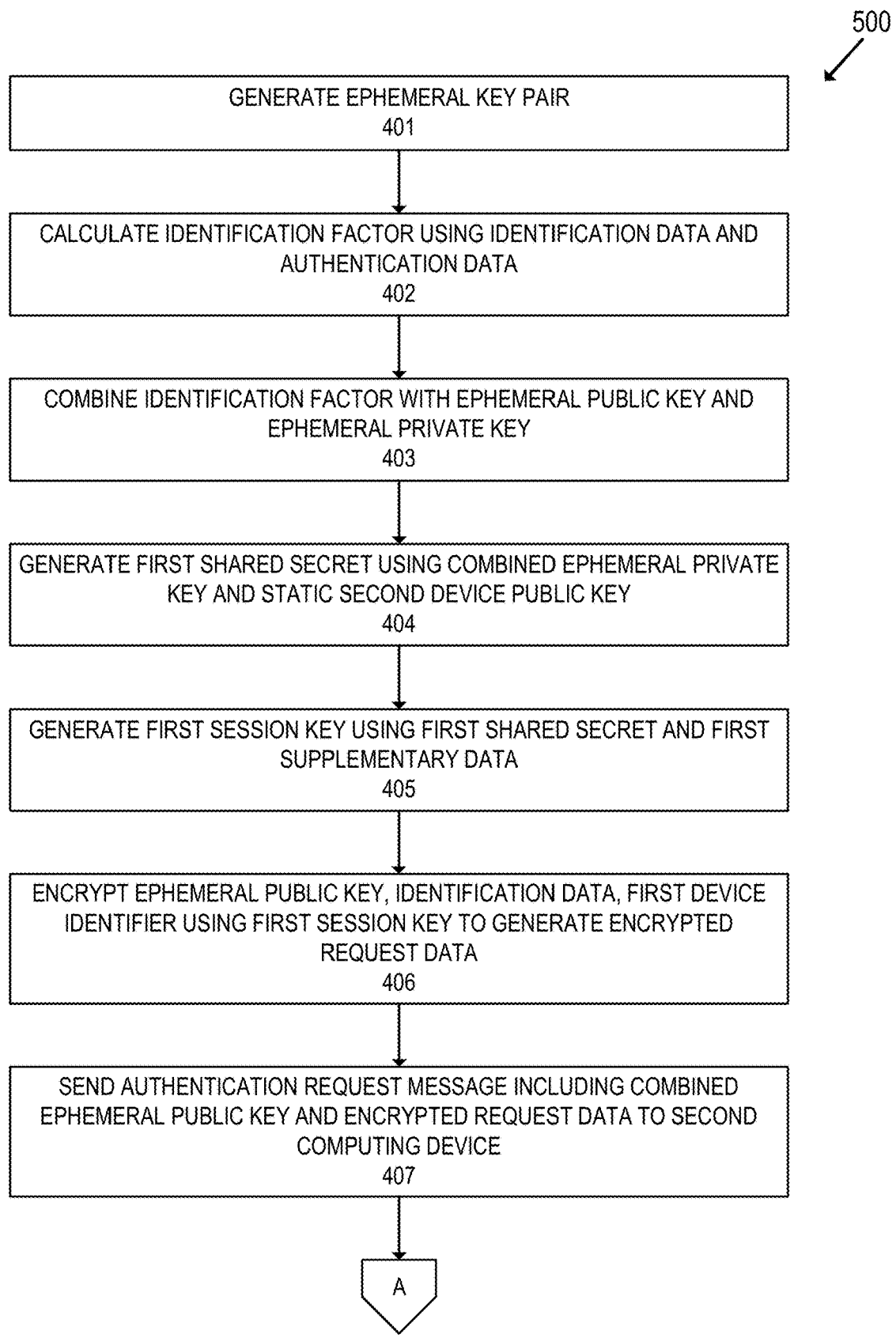
FIGS. 4-5 show a method of securely authenticating to a second computing device and obtaining response data from the second computing device in accordance with some embodiments.
Figure 5:
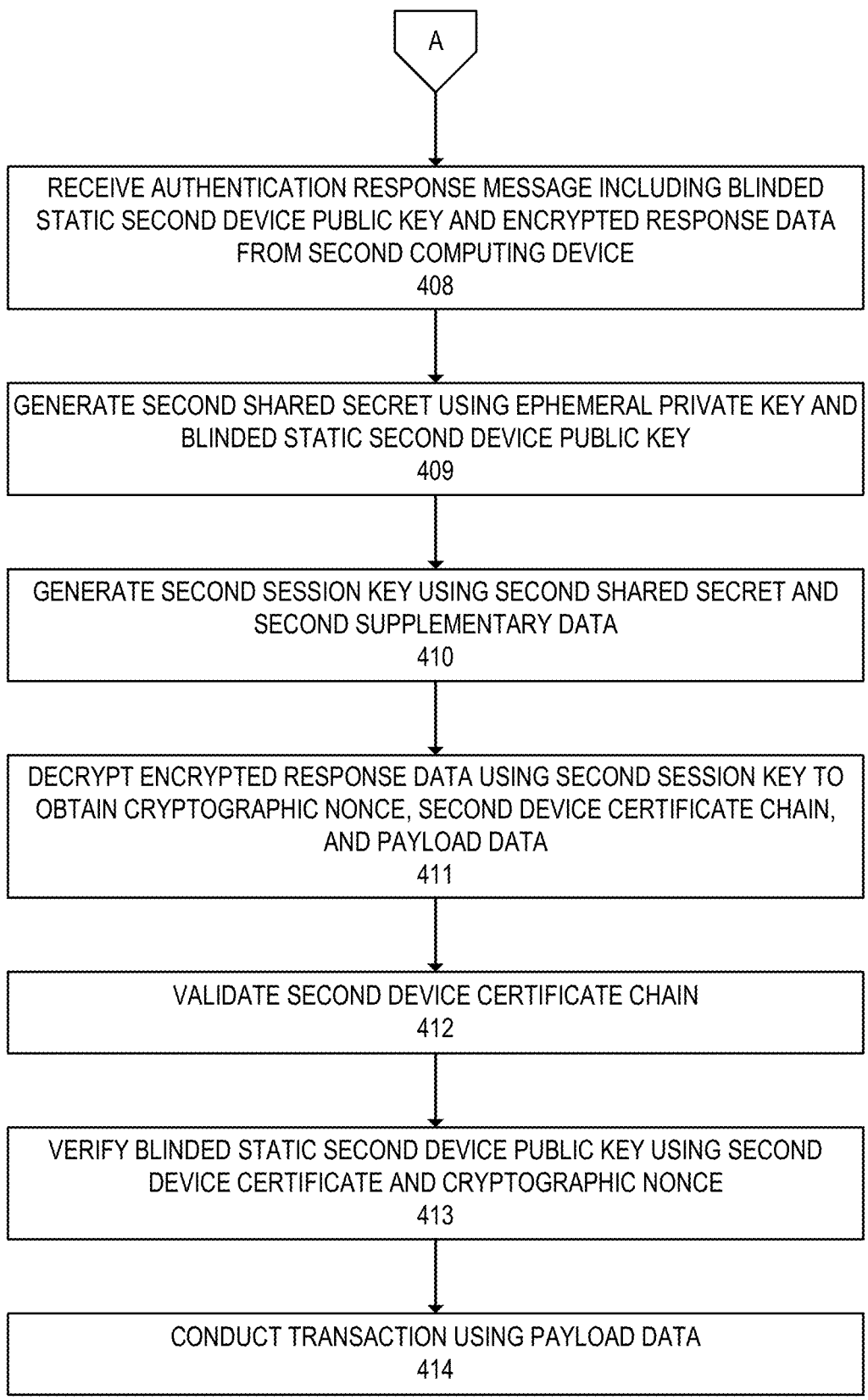

FIGS. 4-5 show a method 400 of securely authenticating to a second computing device 302 and obtaining response data from the second computing device 302 in accordance with some embodiments. In some embodiments, method 400 may be performed by first computing device 301. However, in other embodiments, some or all steps of method 400 may be performed by other entities.

At step 401, an ephemeral key pair is generated. An "ephemeral key pair" may include a public key (i.e., an "ephemeral public key") and a private key (i.e., an "ephemeral private key) generated for use with a single transaction or other communication session. The ephemeral key pair may be of any suitable format, such as ECC or RSA. Typically, the ephemeral key pair may be deleted once a communication session using the ephemeral key has ended, or once one or more shared secrets have been generated using the ephemeral key pair.

At step 402, an identification factor is calculated using identification data and authentication data. Identification data may include any data or information associated with a user or first computing device 301. Examples of identification data may include a name of a user associated with first computing device 301, an organization associated with first computing device 301, payment information such as a primary account number (PAN) associated with first computing device 301, an expiration date associated with first computing device 301, a certificate associated with first computing device 301, an IMEI or serial number of first computing device 301, etc. Authentication data may include any data or information suitable to authenticate a user or first computing device 301. Examples of authentication data may include a password or passphrase, a secret key (e.g., a private key), etc. An identification factor may include any data or information determined from identification data and/or authentication data. For example, in some embodiments, the identification factor may be generated by hashing a combination of the identification data and the authentication data.

At step 403, the identification factor is combined with the ephemeral public key and the ephemeral private key. As a result, a combined ephemeral public key and a combined ephemeral private key may be determined. A combined key may include a key that has been obfuscated or otherwise modified from its original value by combination with another data element or value. For example, the combined ephemeral public key may be a combination of the ephemeral public key and the identification factor. Similarly, the combined ephemeral private key may be a combination of the ephemeral private key and the identification factor. In some embodiments, combining a key with a data element may comprise performing a point multiplication of the key and the data element.

At step 404, a first shared secret is generated using the combined ephemeral private key and a static second device public key. The static second device public key may include a static public key maintained by second computing device 302, such as in a secure element. In some embodiments, the static second device public key may be determined from a digital certificate of second computing device 302, which may have been previously obtained by first computing device 301, and which may be signed by a trusted certificate authority.

The shared secret may be generated from the combined ephemeral private key and the static second device public key using any suitable method. For example, in embodiments using elliptic curve cryptography, the shared secret may be determined using the elliptic-curve Diffie-Hellman protocol (ECDH).

At step 405, a first session key is generated using the first shared secret and first supplementary data. The first supplementary data may include any other data used to generate the first session key. Examples of first supplementary data may include a second device identifier and/or a truncated ephemeral public key.

The session key may be of any suitable format (e.g., AES, DES, Blowfish, etc.), of any suitable length, and generated using any suitable key derivation function (KDF). For example, in one embodiment, the session key may be generated using the Password-Based Key Derivation Function 2 (PBKDF2) algorithm. In some embodiments, other data, such as a first device identifier, may be used as additional inputs to the key derivation function.

At step 406, the ephemeral public key, the identification data, and a first device identifier are encrypted using the first session key to generate encrypted request data. A "first device identifier" may include any identifier suitable to identify a first computing device.

At step 407, an authentication request message including the combined ephemeral public key and the encrypted request data is sent to second computing device 302. In some embodiments, the authentication request message may pass through one or more intermediaries (e.g., untrusted network 303) before reaching second computing device 302.

At step 408, an authentication response message including a blinded static second device public key and encrypted response data is received from second computing device 302. Typically, the blinded static second device public key may be a blinded form of the static second device public key used at step 404 to generate the first shared secret.

At step 409, a second shared secret is generated using the ephemeral private key and the blinded static second device public key received from second computing device 302 at step 408. The second shared secret may be generated from the ephemeral private key and the blinded static second device public key using any suitable method, such as ECDH.

At step 410, a second session key is generated using the second shared secret and second supplementary data. The second supplementary data may include any other data used to generate the second session key. Examples of second supplementary data may include a second device identifier, a first device identifier, and/or a truncated ephemeral public key. The second session key may be generated using any suitable KDF.

At step 411, the encrypted response data is decrypted using the second session key to obtain a cryptographic nonce, a second device certificate chain, and payload data. The second device certificate chain may include a chain of one or more signed certificates from a root CA certificate to a second device certificate, whereby the chain establishes the authenticity of the second device certificate. The payload data may include any suitable data. For example, the payload data may include a confirmation of a transaction, a user's account balance, a cryptogram key such as a limited use key (LUK) that can be used to conduct future transactions, etc.

At step 412, the second device certificate chain is validated. The second device certificate chain may be validated using any suitable online or offline method. For example, for each of the one or more certificates in the chain, the digital signature of the certificate can be validated using a known trusted public key (e.g., a certificate authority's public key, or a public key of an entity appropriately authorized by the CA). For example, in some embodiments, a digital signature algorithm, such as the elliptic curve digital signature algorithm (ECDSA) may be used to validated a certificate.

At step 413, the blinded static second device public key is verified using the second device certificate and the cryptographic nonce. Verifying the blinded static second device public key may include ensuring that the blinded static second device public key matches an expected value. For example, in some cases, a second blinded static second device public key may be generated using the static second device public key included on the second device certificate, and the cryptographic nonce decrypted at step 411. The second blinded static second device public key may then be compared to the blinded static second device public key received at step 408 to ensure that the keys match. Alternatively, in some cases, the blinded static second device public key received at step 408 may be verified by comparing it to a stored blinded static second device public key. If the keys match, second computing device 302 may be authenticated. Otherwise, authentication may fail.

It should be noted that this method of authentication (i.e., verifying a blinded static public key) can provide the advantage that the static second device public key, which may be considered sensitive (as it may reveal the identity of the second computing device 302), does not need to be transmitted in clear text. Thus, authentication of second computing device 302 can be performed while protecting the identity of second computing device 302 from an eavesdropper that captures the authentication request message.

At step 414, a transaction is conducted using the payload data. In some embodiments, the payload data may include a payment credential (e.g., a PAN or a cryptogram key). In such embodiments, a transaction can be conducted using the payment credential. For example, if the payload data includes a cryptogram key, a cryptogram for a transaction can be generated using the cryptogram key. The cryptogram can then be used when conducting the transaction.

B. Second Computing Device

Figure 6:
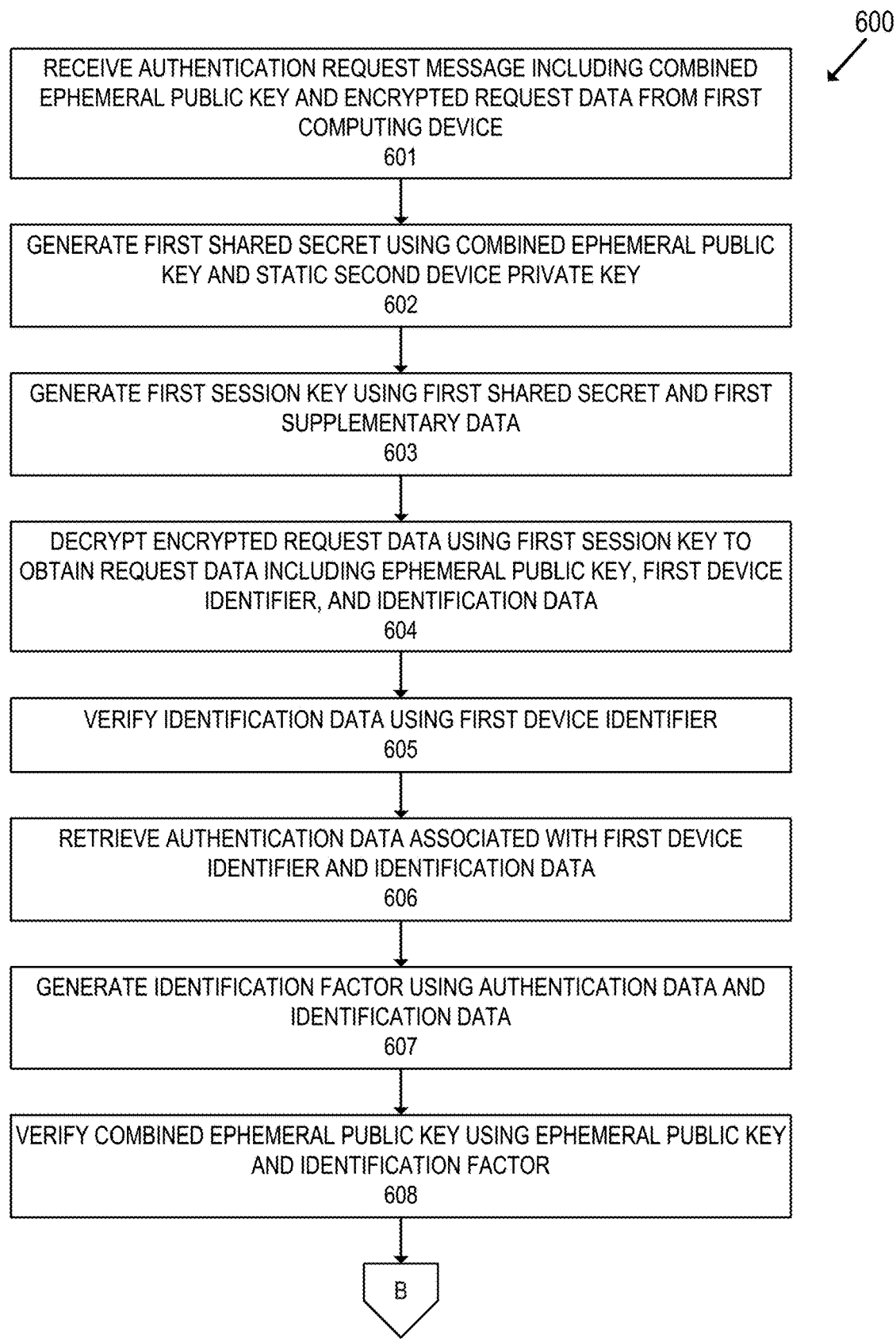
FIGS. 6-7 show a method of securely processing an authentication request message from a first computing device and providing an authentication response message to the first computing device in accordance with some embodiments.
Figure 7:
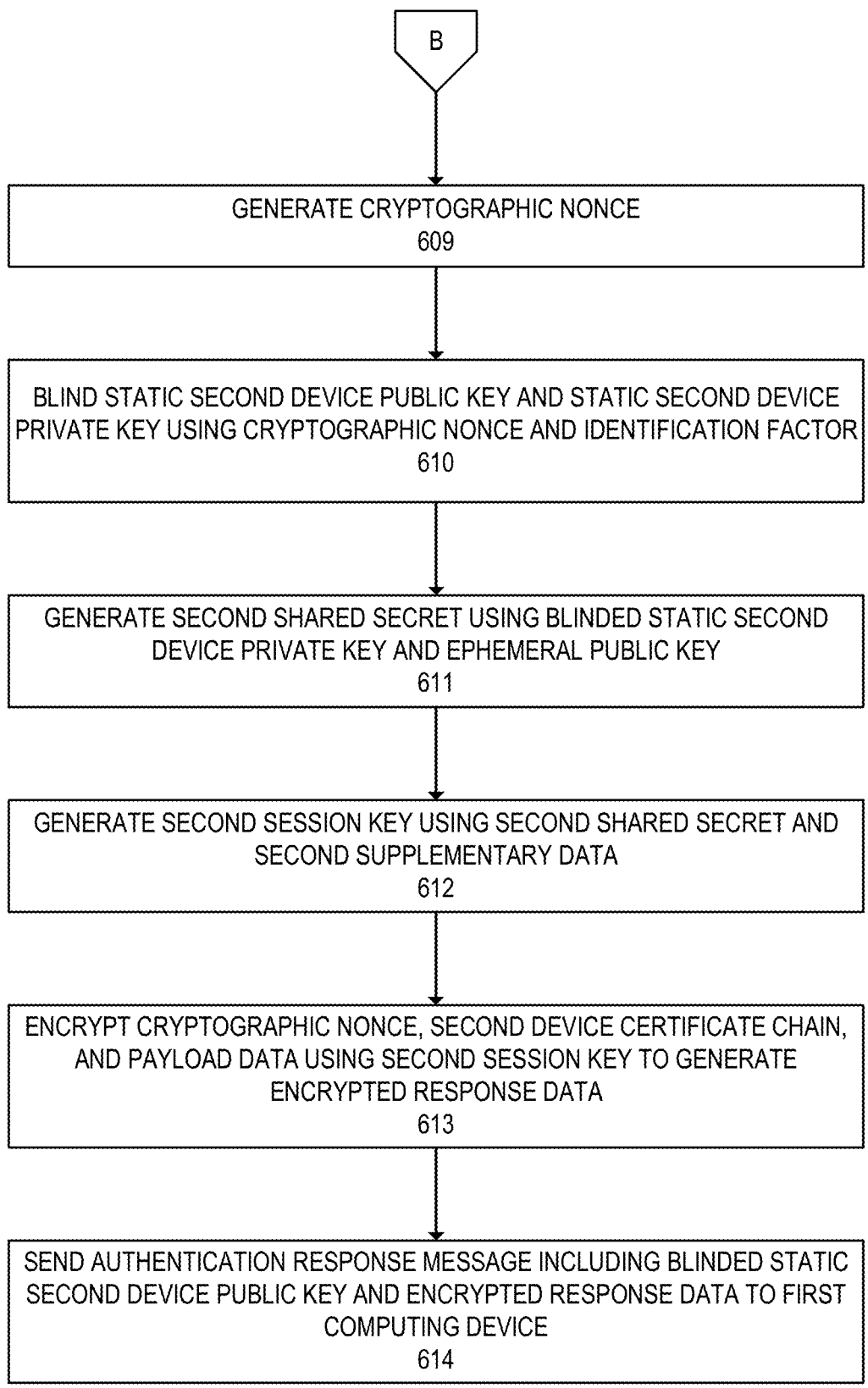

FIGS. 6-7 show a method 600 of securely processing an authentication request message from a first computing device 301 and providing an authentication response message to the first computing device 301 in accordance with some embodiments. In some embodiments, method 600 may be performed by a second computing device 302. However, in other embodiments, some or all steps of method 600 may be performed by other entities.

Typically, before method 600, second computing device 302 maintains a static second device key pair. The static second device key pair may include a public key (i.e., a "static second device public key") and a private key (i.e., a "static second device private key"). Second computing device 302 may also comprise a "second device certificate" including the static second device public key. The second device certificate may be signed by a certificate authority, such as payment processing network 105 or issuer computer 106.

At step 601, an authentication request message including a combined ephemeral public key and encrypted request data is received from first computing device 301. Typically, the combined ephemeral public key may be generated by first computing device 301 using an ephemeral public key and an identification factor (e.g., in accordance with step 403 of method 400).

At step 602, a first shared secret is generated using the combined ephemeral public key received at step 601 and a static second device private key. The shared secret may be generated from the combined ephemeral public key and the static second device private key using any suitable method, such as ECDH.

At step 603, a first session key is generated using the first shared secret and first supplementary data. The first supplementary data may include any other data used to generate the first session key. Typically, the same data used to generate the first session key at the first computing device (e.g., in accordance with step 405 of method 400) may be used at step 603.

At step 604, the encrypted request data is decrypted using the first session key to obtain request data including an ephemeral public key, a first device identifier, and identification data. The ephemeral public key may correspond to the combined ephemeral public key received at step 601. The first device identifier may include any data suitable to identify first computing device 301. Identification data may include any data or information associated with a user or first computing device 301. Examples of identification data may include a name of a user associated with first computing device 301, an organization associated with first computing device 301, payment information such as a primary account number (PAN) associated with first computing device 301, an expiration date associated with first computing device 301, a certificate associated with first computing device 301, an IMEI or serial number of first computing device 301, etc.

At step 605, the identification data is verified using the first device identifier. For example, in some embodiments, the first device identifier may be used retrieve corresponding identification data from a device database. The decrypted identification data can then be verified by comparison to the received identification data.

At step 606, authentication data associated with the first device identifier and/or the identification data is retrieved. Authentication data may include any data or information suitable to authenticate a user or first computing device 301. Examples of authentication data may include a password or passphrase, a secret key (e.g., a private key), etc. In some embodiments, the authentication data can be retrieved from a device database.

At step 607, an identification factor is generated using the retrieved authentication data and the identification data. An identification factor may include any data or information determined from identification data and/or authentication data. For example, in some embodiments, the identification factor may be generated by hashing a combination of the identification data and the authentication data. Typically, the identification factor generated at step 607 is performed in the same manner as at first computing device 301 (e.g., in accordance with step 402).

At step 608, the combined ephemeral public key is verified using the ephemeral public key and the identification factor. Verifying the combined ephemeral public key may include ensuring that the combined ephemeral public key matches an expected value. For example, in some cases, a second combined ephemeral public key may be generated using the ephemeral public key obtained at step 604, and the identification factor determined at step 607. The second combined ephemeral public key may then be compared to the combined ephemeral public key received at step 601 to ensure that the keys match. If the keys match, first computing device 301 may be authenticated. Otherwise, authentication may fail.

It should be noted that this method of authentication (i.e., verifying a combined ephemeral key) provides the advantage that authentication data, which may be sensitive, does not need to be transmitted in plaintext, even in encrypted form. Thus, even if the static second device private key is later compromised (however unlikely), the plaintext authentication data is not exposed. Furthermore, since blinding of a key is typically irreversible, an attacker cannot derive the identification factor, let alone the authentication data used to generate the identification factor, even with knowledge of both the combined ephemeral public key and the ephemeral public key.

At step 609, a cryptographic nonce is generated. The cryptographic nonce may be a random or pseudo-random data value generated using any suitable method.

At step 610, the static second device public key and the static second device private key are blinded using the cryptographic nonce and the identification factor. As a result, a blinded static second device public key and a blinded static second device private key may be determined. A blinded key may include a key that has been obfuscated or otherwise modified from its original value by combination with one or more other data elements. For example, the combined ephemeral public key may be a combination (e.g., a point multiplication) of the ephemeral public key, the cryptographic nonce, and the identification factor. Similarly, a combined ephemeral private key may be a combination of the ephemeral private key, the cryptographic nonce, and the identification factor.

At step 611, a second shared secret is generated using the blinded static second device private key and the ephemeral public key. The shared secret may be generated from the combined ephemeral public key and the static second device private key using any suitable method, such as ECDH.

At step 612, a second session key is generated using the second shared secret and second supplementary data. The second supplementary data may include any other data used to generate the second session key. Typically, the same data used to generate the second session key at the first computing device (e.g., in accordance with step 410 of method 400) may be used at step 612.

At step 613, the cryptographic nonce, a second device certificate chain, and payload data are encrypted using the second session key to generate encrypted response data. The second device certificate chain may include a chain of one or more signed certificates from a root CA certificate to a second device certificate, whereby the chain establishes the authenticity of the second device certificate. The payload data may include any suitable data. For example, the payload data may include a confirmation of a transaction, a user's account balance, a cryptogram key such as a limited use key (LUK) that can be used to conduct future transactions, etc.

At step 614, an authentication response message including the blinded static second device public key and the encrypted response data is sent to first computing device 301. In some embodiments, the authentication response message may pass through one or more intermediaries (e.g., untrusted network 303) before reaching first computing device 301.

III. Authenticated Communication Flows

Figure 8:
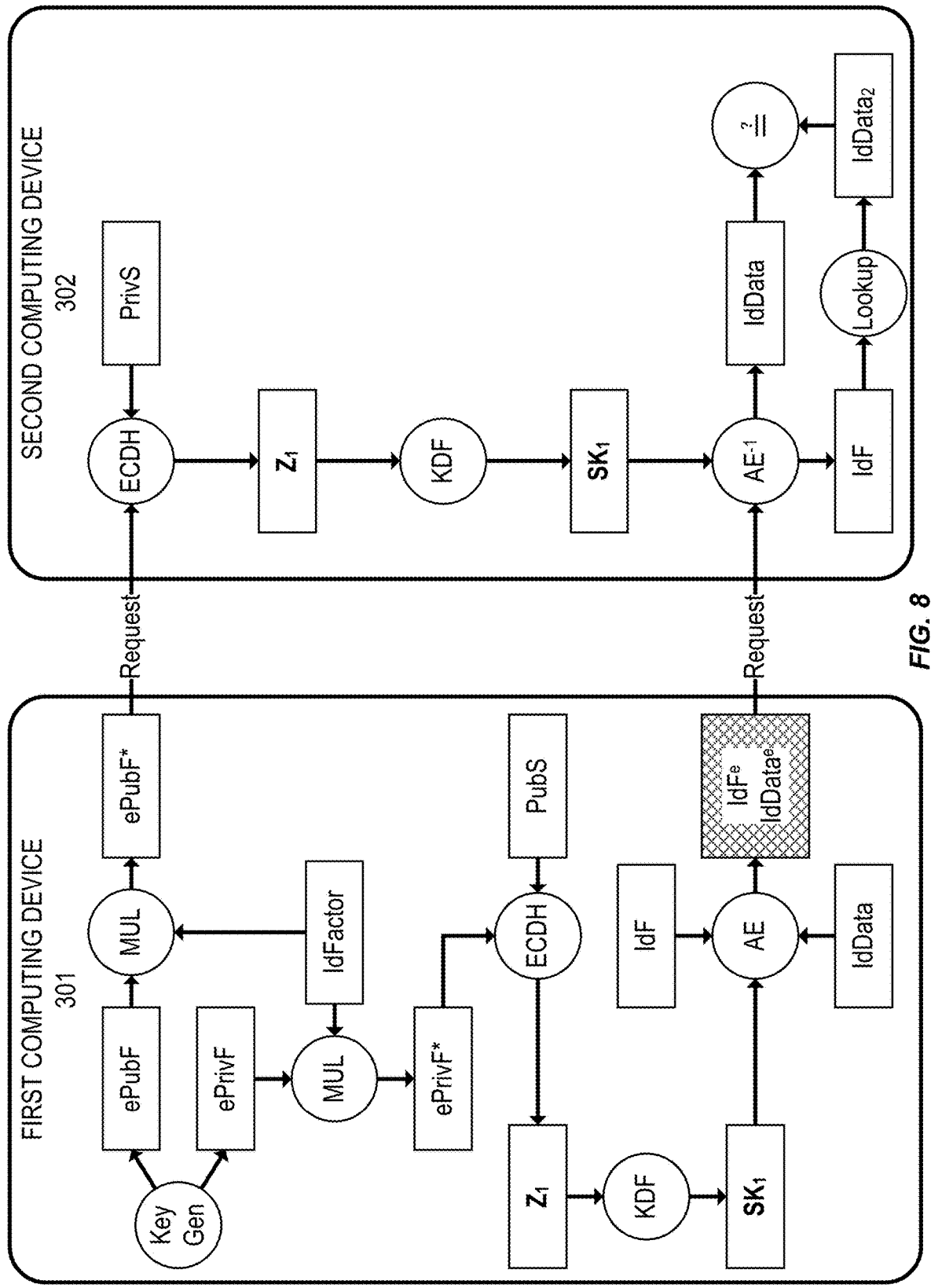
FIG. 8 shows a data flow diagram illustrating operations performed in generating, transmitting, and processing an authentication request message in accordance with some embodiments.
Figure 9:
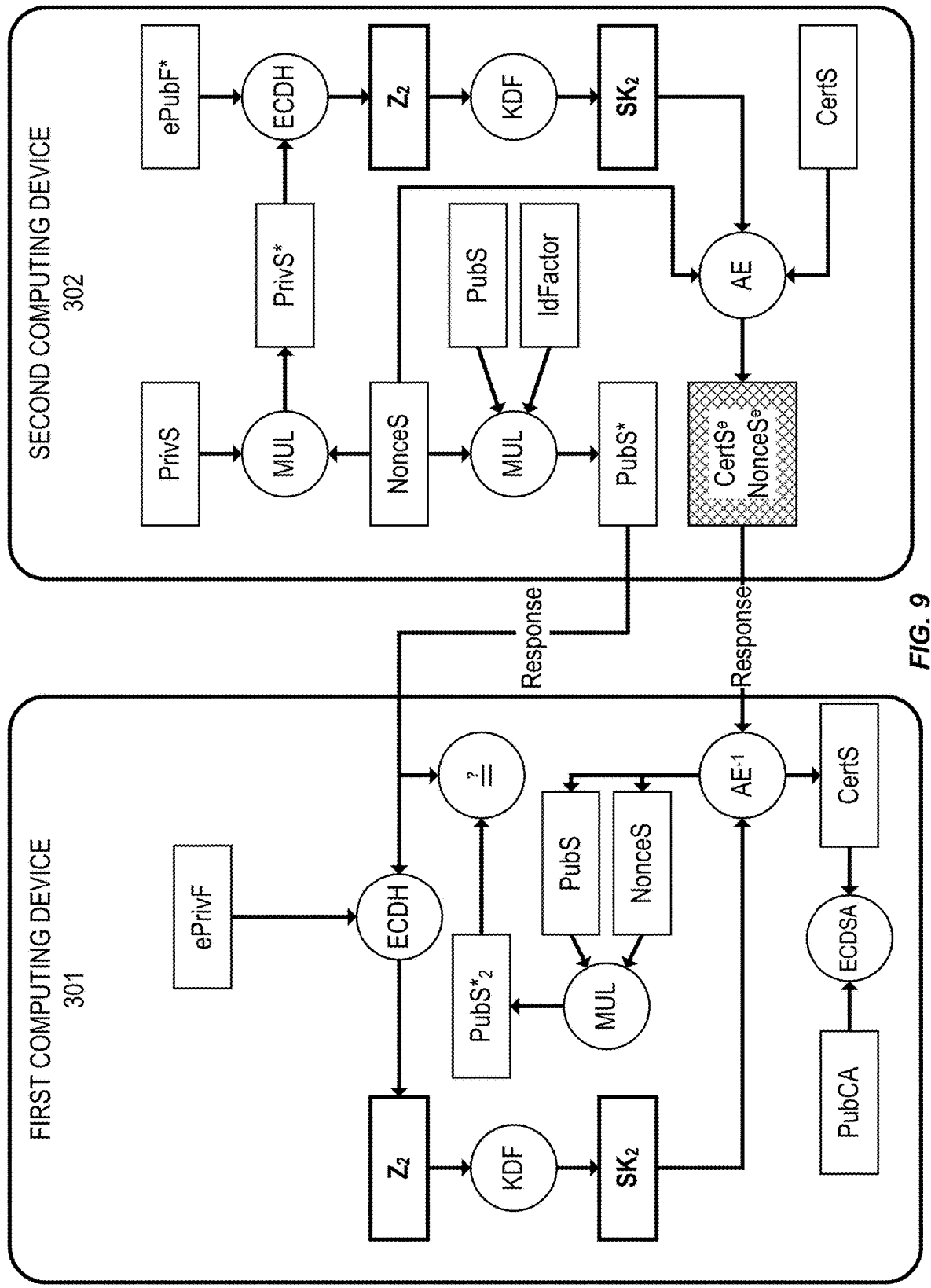
FIG. 9 shows a data flow diagram illustrating operations performed in generating, transmitting, and processing an authentication response message in accordance with some embodiments.

FIGS. 8 and 9 are data flow diagrams illustrating the computation and transmission of various data elements in accordance with some embodiments of the invention. As shown in FIGS. 8 and 9, a rectangular box indicates a data element (e.g., an identification factor), and a circle indicates an operation to be performed (e.g., key generation). Each arrow into a circle indicates an operand for the corresponding operator, and each arrow out of a circle indicates a result of the corresponding operator. However, it should be noted that some embodiments may not use all shown operands for an operation, and some embodiments may use additional operands for the operations shown. In addition, embodiments may not necessarily perform all shown operations, and/or may perform additional operations that are not shown in FIGS. 8 and 9.

A. Authentication Request Message

FIG. 8 shows a data flow diagram illustrating operations performed in generating, transmitting, and processing an authentication request message in accordance with some embodiments.

As shown in FIG. 8, first computing device 301 uses a public/private key pair generator (KeyGen) to generate an ephemeral public key (ePubF) and an ephemeral private key (ePrivF). The ephemeral public key (ePubF) is combined with an identification factor (IdFactor) to generate a combined ephemeral public key (ePubF). Similarly, the ephemeral private key (ePrivF) is combined with the identification factor (IdFactor) to generate a combined ephemeral private key (ePrivF*). First computing device 301 uses the combined ephemeral private key (ePrivF*) and a static second device public key (PubS) as inputs to an elliptic-curve Diffie-Hellman (ECDH) operation to generate a first shared secret ($Z_1$). The first shared secret is used as an input to a key derivation function (KDF) to derive a first session key ($SK_1$). First computing device 301 encrypts a first device identifier (IdF), and identification data (IdData) using the first session key ($SK_1$) by means of an authenticated encryption (AE) algorithm, resulting in encrypted request data. The encrypted request data and the combined ephemeral public key (ePubF*) are sent to the second computing device 302 in a request message.

Once second computing device 302 receives the request message, second computing device 302 generates the first shared secret ($Z_1$) using the received combined ephemeral public key (ePubF*) and a static second device private key (PrivS). A key derivation function (KDF) is used to derive the first session key ($SK_1$) using the first shared secret. Second computing device 302 then decrypts the encrypted request data using the first session key ($SK_1$) to determine the identification data (IdData) and the first device identifier (IdF). The first device identifier (IdF) can be used to retrieve (Lookup) identification data ($IdData_2$) previously stored for first computing device 301. If the retrieved identification data ($IdData_2$) and the decrypted identification data (IdData) match, authentication of first computing device 301 is successful. Otherwise, authentication fails.

B. Authentication Response Message

FIG. 9 shows a data flow diagram illustrating operations performed in generating, transmitting, and processing an authentication response message in accordance with some embodiments.

As shown in FIG. 9, second computing device 302 combines (MUL) a static second device private key (PrivS) with a cryptographic nonce (NonceS) to generate a blinded static second device private key (PrivS*). Similarly, a static second device public key (PubS) is combined (MUL) with the cryptographic nonce (NonceS) and an identification factor (IdFactor) to generate a blinded static second device public key (PubS*).

The blinded static second device private key (ePrivS*) and a combined ephemeral first device public key (ePubF*), which may have been received in a request message in accordance with FIG. 8, are combined using an elliptic curve Diffie-Hellman (ECDH) operation to determine a second shared secret ($Z_2$). The second shared secret ($Z_2$) is used with a key derivation function (KDF) to determine a second session key ($SK_2$). Second computing device 302 encrypts the cryptographic nonce (NonceS), and a second device certificate (CertS) to determine encrypted response data. Second computing device 302 then sends a response message including the encrypted response data and the blinded static second device public key (PubS*) to first computing device 301.

Once first computing device 301 receives the response message, first computing device 301 uses the received blinded static second device public key (PubS*) and an ephemeral private key (ePrivF), which may have been generated in accordance with FIG. 8, to generate a second shared secret ($Z_2$) using an elliptic curve Diffie-Hellman (ECDH) algorithm. A key derivation function (KDF) may be used to generate a second session key ($SK_2$) using the second shared secret ($Z_2$). Second computing device 302 then decrypts the encrypted response data using the second session key ($SK_2$) to determine the second device certificate (CertS), the cryptographic nonce (NonceS), and the static second device public key (PubS), which may be extracted from the second device certificate (CertS).

Second computing device 302 can combine (MUL) the cryptographic nonce (NonceS) and the static second device public key (PubS) to generate a second device session identifier ($PubS^*_2$). The second device session identifier ($PubS^*_2$) is then compared to the blinded static second device public key (PubS*) received from second computing device 302. Authentication may require the second device session identifier ($PubS^*_2$) and the blinded static second device public key (PubS*) to match.

In addition, second computing device 302 verifies the second device certificate (CertS) using an elliptic curve digital signature algorithm (ECDSA) and a public key of a trusted certificate authority (PubCA). In some embodiments, authentication may require both the verification of the blinded static second device public key (PubS*) and the second device certificate (CertS).

IV. Forward Secret Authenticated Communication Methods

Figure 10:
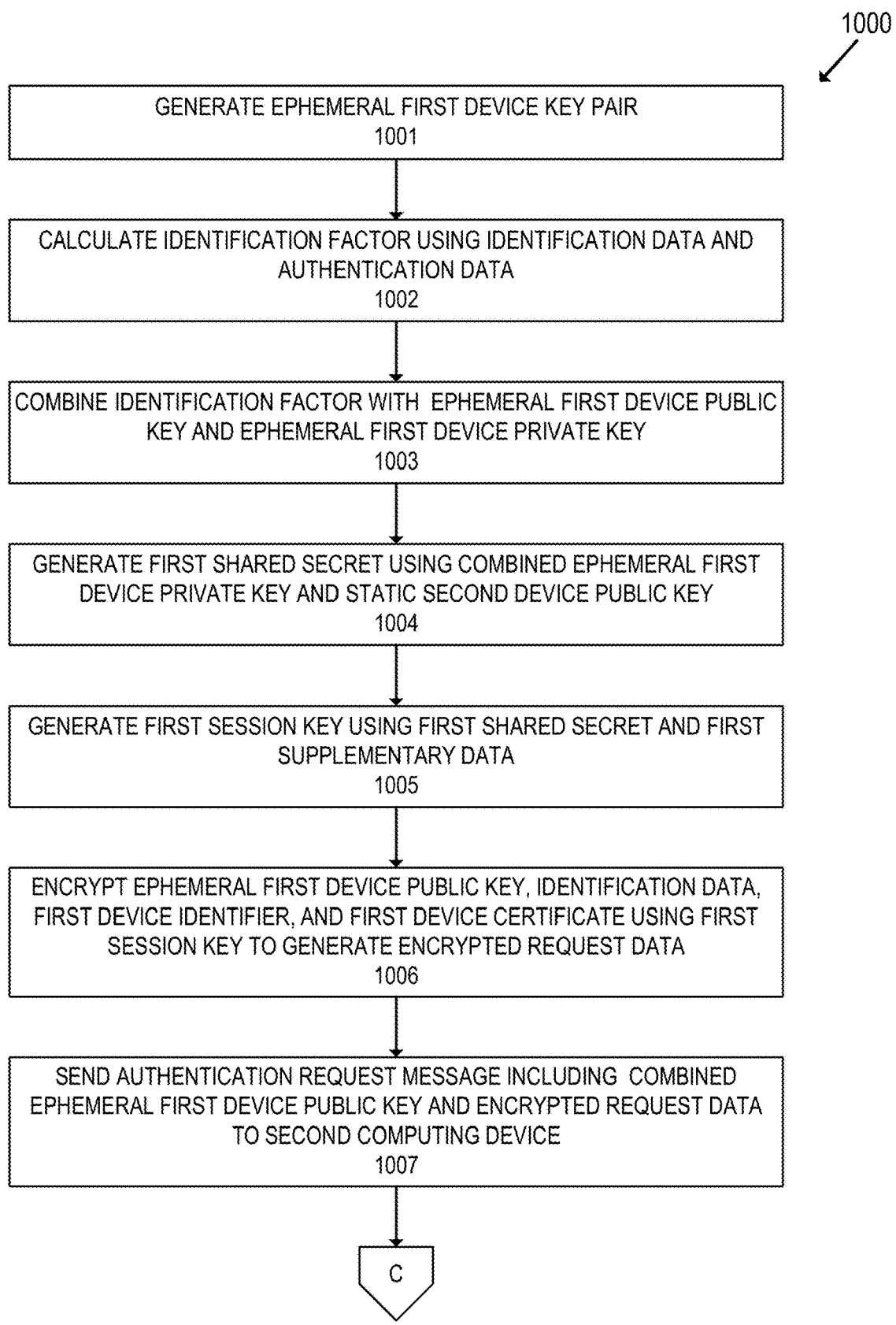
FIGS. 10-11 show a second method of securely authenticating to a second computing device and obtaining response data from the second computing device in accordance with some embodiments.
Figure 11:
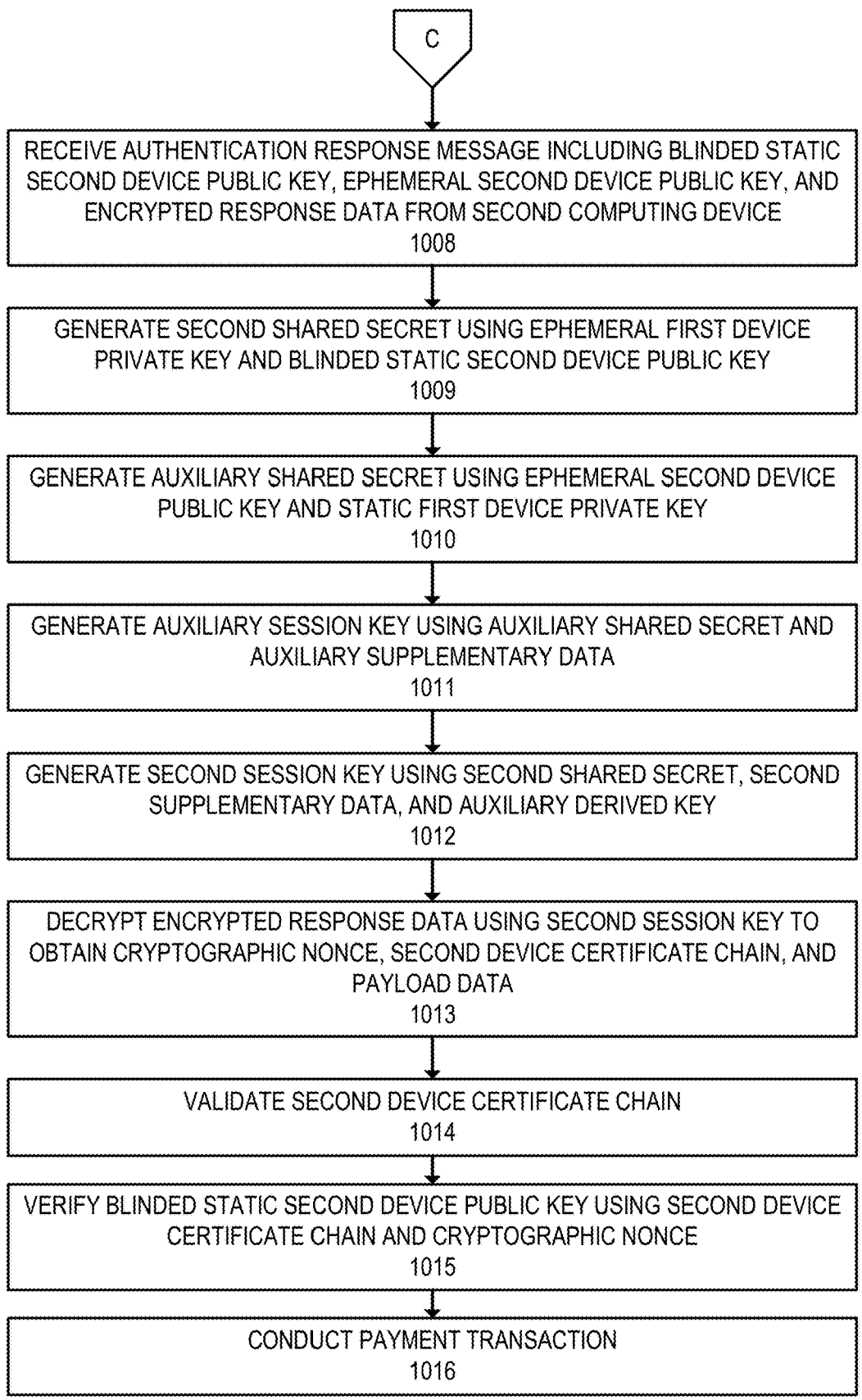

In some embodiments of the invention, a first computing device 301 may maintain a static first device key pair comprising a public key (i.e., a "static first device public key"), and a private key (i.e., a "static first device private key"). Embodiments can use the static first device key pair to generate a second session key used to encrypt and decrypt response data in a response message. This can allow embodiments to provide the property of forward secrecy for the response message—a later compromise of either of devices 301 or 302 would not expose the encrypted response data. Thus, embodiments described below can provide additional data transport security A. First Computing Device FIGS. 10-11 show a second method 1000 of securely authenticating to a second computing device 302 and obtaining response data from second computing device 302 in accordance with some embodiments. In some embodiments, method 1000 may be performed by first computing device 301. However, in other embodiments, some or all steps of method 1000 may be performed by other entities.

Typically, prior to method 1000, first computing device 301 may maintain a "static first device key pair" comprising a "static first device private key" (that may be stored in a secure element), and a "static first device public key". The static first device public key may be included in a first device certificate signed by a certificate authority recognized by second computing device 302.

Analogously, second computing device 302 may maintain a "static second device key pair" comprising a "static second device private key" (that may be stored in a hardware security module) and a "static second device public key." The static second device public key may be included in a second device certificate signed by a certificate authority recognized by first computing device 301.

At step 1001, an ephemeral first device key pair is generated. An "ephemeral first device key pair" may include a public key (i.e., an "ephemeral first device public key") and a private key (i.e., an "ephemeral first device private key") generated for use with a single transaction or other communication session. The ephemeral first device key pair may be of any suitable format. Typically, the ephemeral first device key pair may be deleted once a communication session using the ephemeral first device key pair has ended, or once one or more shared secrets have been generated using the ephemeral first device key pair.

At step 1002, an identification factor is calculated using identification data and authentication data. In some embodiments, the identification factor may be calculated in a similar manner to that described for step 402 of method 400.

At step 1003, the ephemeral first device public key and the ephemeral first device private key are blinded using the identification factor. As a result, a combined ephemeral first device public key and a combined ephemeral first device private key may be determined. In some embodiments, the keys may be blinded in a similar manner to that described for step 403 of method 400.

At step 1004, a first shared secret is generated using the combined ephemeral first device private key and a static second device public key. The static second device public key may include a static public key maintained by second computing device 302, such as in a secure element. In some embodiments, the first shared secret may be generated in a similar manner to that described for step 404 of method 400.

At step 1005, a first session key is generated using the first shared secret and first supplementary data. In some embodiments, the first session key may be generated in a similar manner to that described for step 405 of method 400.

At step 1006, the ephemeral first device public key, the identification data, a first device identifier, and a first device certificate are encrypted using the first session key to generate encrypted request data. A "first device identifier" may include any identifier suitable to identify a first computing device. A "first device certificate" may include any digital certificate that includes static first device public key and is signed by a certificate authority recognizable by second computing device 302.

At step 1007, an authentication request message including the combined ephemeral first device public key and the encrypted request data is sent to second computing device 302. In some embodiments, the authentication request message may pass through one or more intermediaries (e.g., untrusted network 303) before reaching second computing device 302.

At step 1008, an authentication response message is received from second computing device 302. The authentication response message includes a blinded static second device public key, an ephemeral second device public key, and encrypted response data. Typically, the blinded static second device public key may be a blinded form of the static second device public key used at step 1004 to generate the first shared secret. The ephemeral second device public key may be the public key of an ephemeral key pair generated by second computing device 302 in response to receiving the authentication request message. For example, in some embodiments, the ephemeral second device public key may be generated in accordance with step 1213 of method 1200.

At step 1009, a second shared secret is generated using the ephemeral first device private key and the blinded static second device public key. In some embodiments, the second shared secret may be generated in a similar manner to that described for step 409 of method 400.

At step 1010, an auxiliary shared secret is generated using the ephemeral second device public key received at step 1108, and the static first device private key. The auxiliary shared secret may be generated from the ephemeral second device public key and the blinded static first device private key using any suitable method, such as ECDH.

At step 1011, an auxiliary session key is generated using the auxiliary shared secret and auxiliary supplementary data. The auxiliary supplementary data may include any other data used to generate the auxiliary session key. Examples of auxiliary supplementary data may include a first device identifier and/or a truncated ephemeral second device public key.

At step 1012, a second session key is generated using the second shared secret, second supplementary data, and the auxiliary session key. The second supplementary data may include any other data used to generate the second session key. Examples of second supplementary data may include a second device identifier, a first device identifier, and/or a truncated ephemeral public key. The second session key may be generated using any suitable KDF.

At step 1013, the encrypted response data is decrypted using the second session key to obtain a cryptographic nonce, a second device certificate chain, and payload data. The second device certificate chain may include a chain of one or more signed certificates from a root CA certificate to a second device certificate, whereby the chain establishes the authenticity of the second device certificate. The payload data may include any suitable data. For example, the payload data may include a confirmation of a transaction, a user's account balance, a cryptogram key such as a limited use key (LUK) that can be used to conduct future transactions, etc.

At step 1014, the second device certificate chain is validated. The second device certificate chain may be validated using any suitable online or offline method. In some embodiments, the second device certificate chain may be validated in a similar manner to that described for step 412 of method 400.

At step 1015, the blinded static second device public key is verified using the second device certificate and the cryptographic nonce. Verifying the blinded second device public key may include ensuring that the blinded second device public key matches an expected value. In some embodiments, the blinded static second device public key may be verified in a similar manner to that described for step 413 of method 400.

At step 1116, a transaction is conducted using the payload data. In some embodiments, the payload data may include a payment credential (e.g., a PAN or a cryptogram key). In such embodiments, a transaction can be conducted using the payment credential. For example, if the payload data includes a cryptogram key, a cryptogram for a transaction can be generated using the cryptogram key. The cryptogram can then be used when conducting the transaction.

It should be noted that the use of an auxiliary session key as described above to generate the second session key can provide the advantage of forward secrecy for the authentication response message. For instance, even if the blinded static second device public key and the ephemeral second device public key are observed in transit by an eavesdropper, and the static first device private key is later compromised, the second session key cannot be re-generated by an attacker because the ephemeral first device private key (which is necessary to regenerate the second session key) would have already been deleted. Without the second session key, the encrypted response data cannot be decrypted. Thus, such embodiments allow communication to remain secure even in the unlikely event of a later compromise of first computing device 301.

B. Second Computing Device

Figure 12:
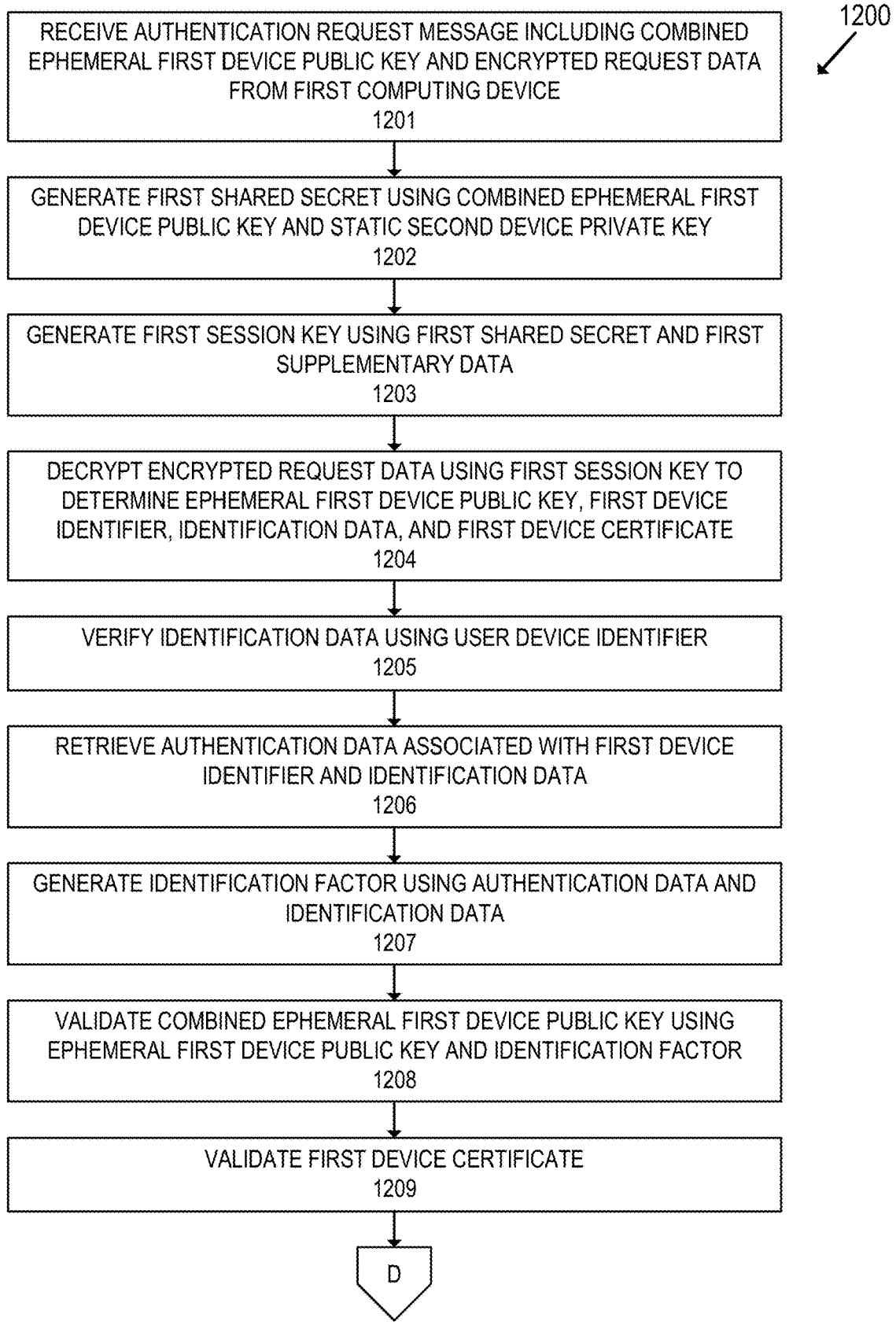
FIGS. 12-13 show a second method of securely processing an authentication request message from a first computing device and providing an authentication response message to the first computing device in accordance with some embodiments.
Figure 13:
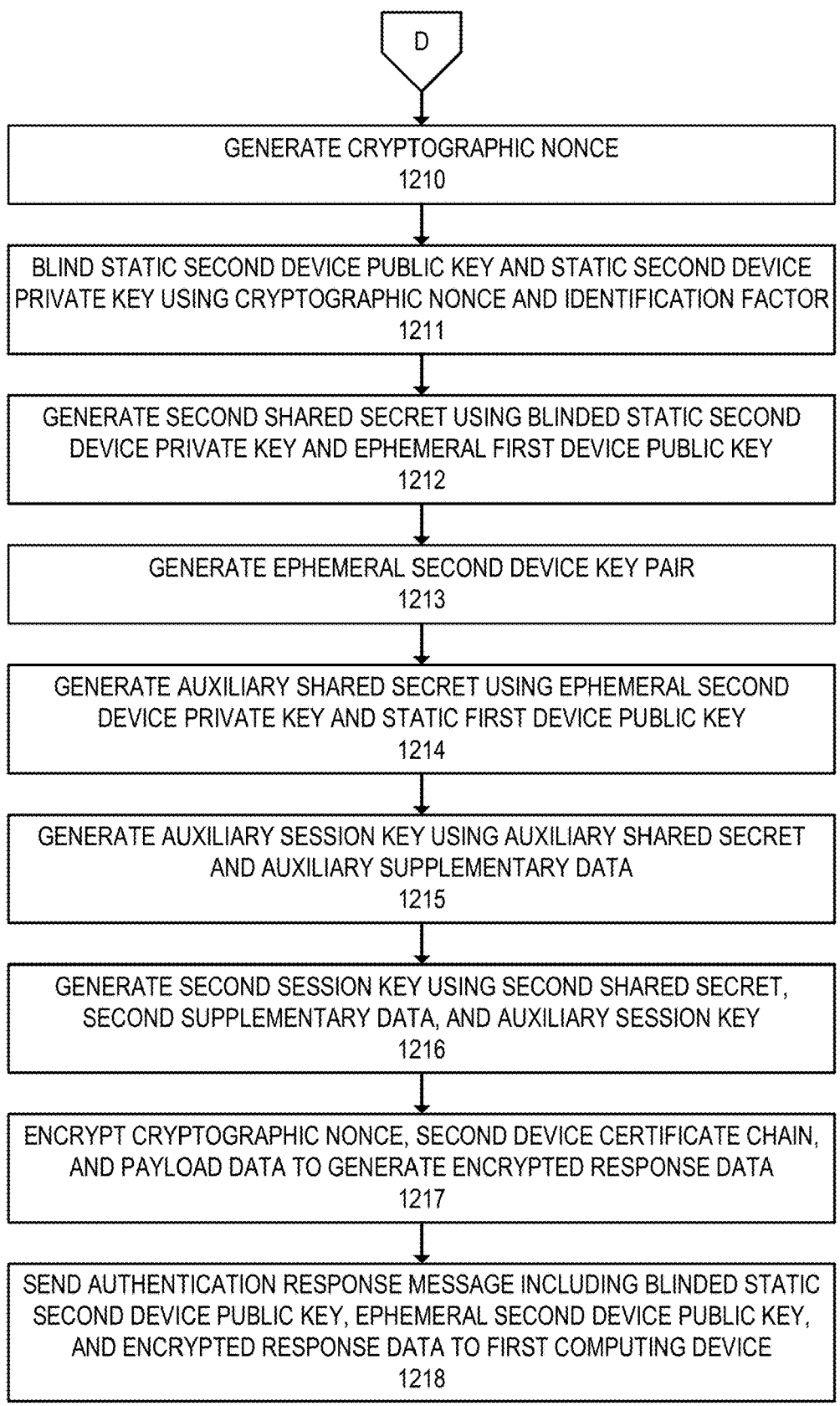

FIGS. 12-13 show a second method 1200 of securely processing an authentication request message from a first computing device 301 and providing an authentication response message to first computing device 301 in accordance with some embodiments. In some embodiments, method 1200 may be performed by second computing device 302. However, in other embodiments, some or all steps of method 1200 may be performed by other entities.

Typically, prior to method 1200, first computing device 301 may maintain a "static first device key pair" comprising a "static first device private key" (that may be stored in a secure element), and a "static first device public key". The static first device public key may be included in a first device certificate signed by a certificate authority recognized by second computing device 302.

Analogously, second computing device 302 may maintain a "static second device key pair" comprising a "static second device private key" (that may be stored in a hardware security module) and a "static second device public key." The static second device public key may be included in a second device certificate signed by a certificate authority recognized by first computing device 301.

At step 1201, an authentication request message including a combined ephemeral first device public key and encrypted request data is received from first computing device 301. Typically, the combined ephemeral first device public key may be generated by first computing device 301 using an ephemeral first device public key and an identification factor (e.g., in accordance with step 1103 of method 1000).

At step 1202, a first shared secret is generated using the combined ephemeral first device public key received at step 1201 and a static second device public key. In some embodiments, the first shared secret may be generated in a similar manner to that described for step 602 of method 600.

At step 1203, a first session key is generated using the first shared secret and first supplementary data. The first supplementary data may include any other data used to generate the first session key. Typically, the same supplementary data used to generate the first session key at the first computing device (e.g., in accordance with step 1005 of method 1000) may be used at step 1203.

At step 1204, the encrypted request data is decrypted using the first session key to obtain request data including an ephemeral first device public key, a first device identifier, identification data, and a first device certificate. The ephemeral first device public key may correspond to the combined ephemeral public key received at step 1201. The first device identifier may include any data suitable to identify first computing device 301. Identification data may include any data or information associated with a user or first computing device 301. The first device certificate may include any digital certificate that includes static first device public key.

At step 1205, the identification data is verified using the first device identifier. In some embodiments, the identification data may be verified in a similar manner to that described for step 605 of method 600.

At step 1206, authentication data associated with the first device identifier and/or the identification data is retrieved. In some embodiments, the authentication data may be retrieved in a similar manner to that described for step 606 of method 600.

At step 1207, an identification factor is generated using the retrieved authentication data and the identification data. In some embodiments, the identification factor may be generated in a similar manner to that described for step 607 of method 600.

At step 1208, the combined ephemeral first device public key is verified using the ephemeral first device public key and the identification factor. In some embodiments, the combined ephemeral first device public key may be verified in a similar manner to that described for step 608 of method 600.

At step 1209, the first device certificate is validated. For example, in some embodiments, a digital signature algorithm, such as the elliptic curve digital signature algorithm (ECDSA) may be used to validated the device certificate. If the combined ephemeral first device public key and the device certificate are verified and validated, respectively, then first computing device 301 is authenticated. Otherwise, authentication of first computing device 301 may fail.

At step 1210, a cryptographic nonce is generated. The cryptographic nonce may be a random or pseudo-random data value generated using any suitable method.

At step 1211, the static second device public key and the static second device private key are blinded using the cryptographic nonce and the identification factor. As a result, a blinded static second device public key and a blinded static second device private key may be determined. In some embodiments, the keys may be blinded in a similar manner to that described for step 610 of method 600.

At step 1212, a second shared secret is generated using the blinded static second device private key and the ephemeral first device public key. The second shared secret may be generated from the ephemeral first device public key and the blinded static second device private key using any suitable method, such as ECDH.

At step 1213, an ephemeral second device key pair is generated. An "ephemeral second device key pair" may include a public key (i.e., an "ephemeral second device public key") and a private key (i.e., an "ephemeral second device private key") generated for use with a single transaction or other communication session. The ephemeral second device key pair may be of any suitable format. Typically, the ephemeral second device key pair may be deleted once a communication session using the ephemeral second device key pair has ended, or once one or more shared secrets have been generated using the ephemeral second device key pair.

At step 1214, an auxiliary shared secret is generated using the ephemeral second device private key and the static first device public key. The auxiliary shared secret may be generated from the ephemeral second device private key and the static first device public key using any suitable method, such as ECDH.

At step 1215, an auxiliary session key is generated using the auxiliary shared secret and auxiliary supplementary data. The auxiliary supplementary data may include any other data used to generate the auxiliary session key. Typically, the same auxiliary supplementary data used to generate the auxiliary session key at the first computing device (e.g., in accordance with step 1011 of method 1000) may be used at step 1215.

At step 1216, a second session key is generated using the second shared secret, second supplementary data, and the auxiliary session key. Typically, the same supplementary data used to generate the second session key at the first computing device (e.g., in accordance with step 1012 of method 1000) may be used at step 1216. The second session key may be generated using any suitable KDF.

At step 1217, the cryptographic nonce, a second device certificate chain, and payload data are encrypted using the second session key to generate encrypted response data. The second device certificate chain may include a chain of one or more signed certificates from a root CA certificate to a second device certificate, whereby the chain establishes the authenticity of the second device certificate. The payload data may include any suitable data. For example, the payload data may include a confirmation of a transaction, a user's account balance, a cryptogram key such as a limited use key (LUK) that can be used to conduct future transactions, etc.

At step 1218, an authentication response message including the blinded static second device public key, the ephemeral second device public key, and the encrypted response data is sent to first computing device 301. In some embodiments, the authentication response message may pass through one or more intermediaries (e.g., untrusted network 303) before reaching first computing device 301.

It should be noted that the use of an auxiliary session key as described above to generate the second session key can provide the advantage of forward secrecy for the authentication response message. For instance, even if the blinded static second device public key and the ephemeral second device public key are observed in transit by an eavesdropper, and the static second device private key is later compromised, the second session key cannot be re-generated by an attacker because the ephemeral second device private key (which is necessary to regenerate the second session key) would have already been deleted. Without the second session key, the encrypted response data cannot be decrypted. Thus, such embodiments allow communication to remain secure even in the unlikely event of a later compromise of second computing device 302.

V. Forward Secret Authenticated Communication Flows

Figure 14:
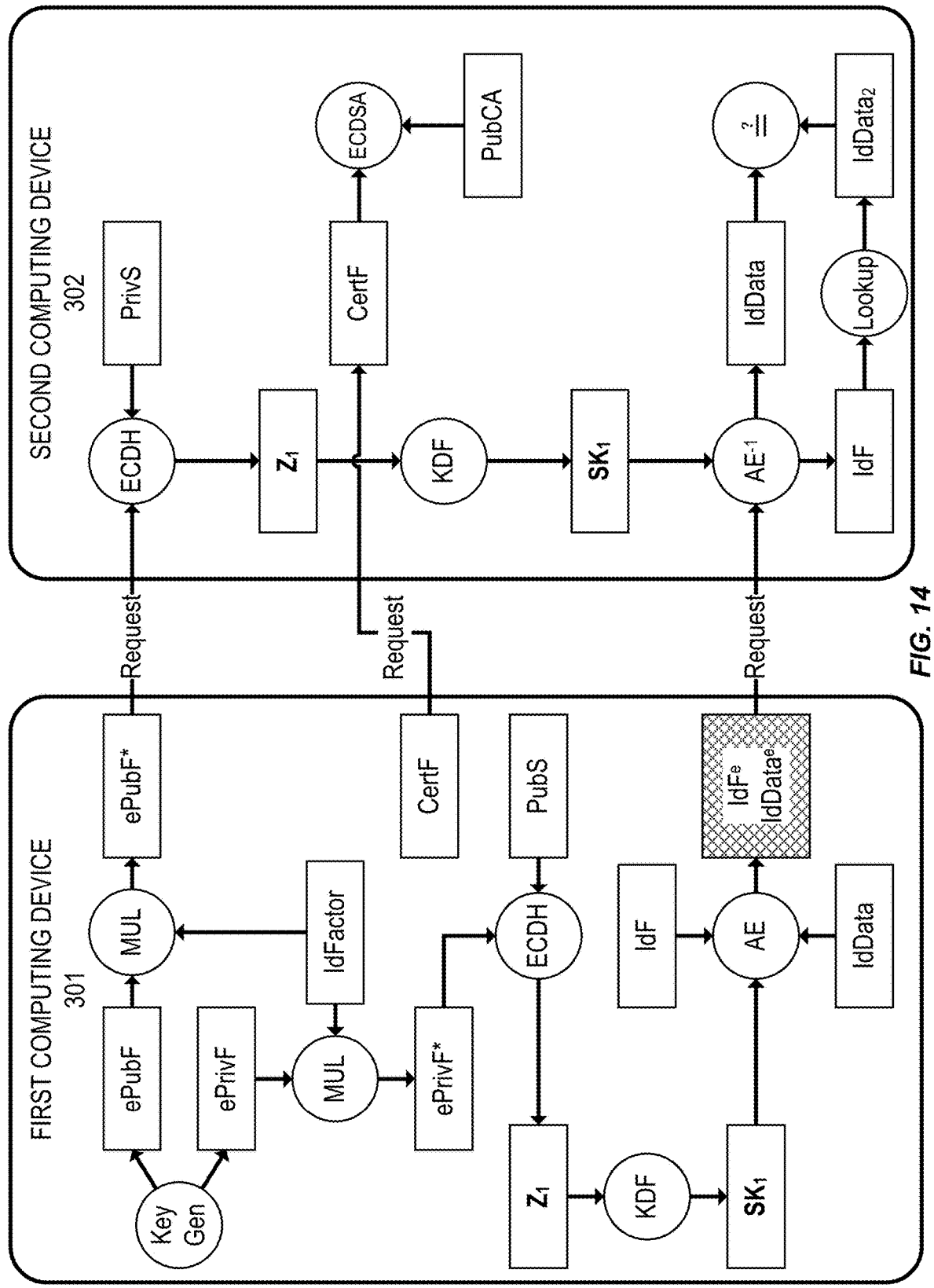
FIG. 14 shows a data flow diagram illustrating operations performed in a second method of generating, transmitting, and processing an authentication request message in accordance with some embodiments.
Figure 15:
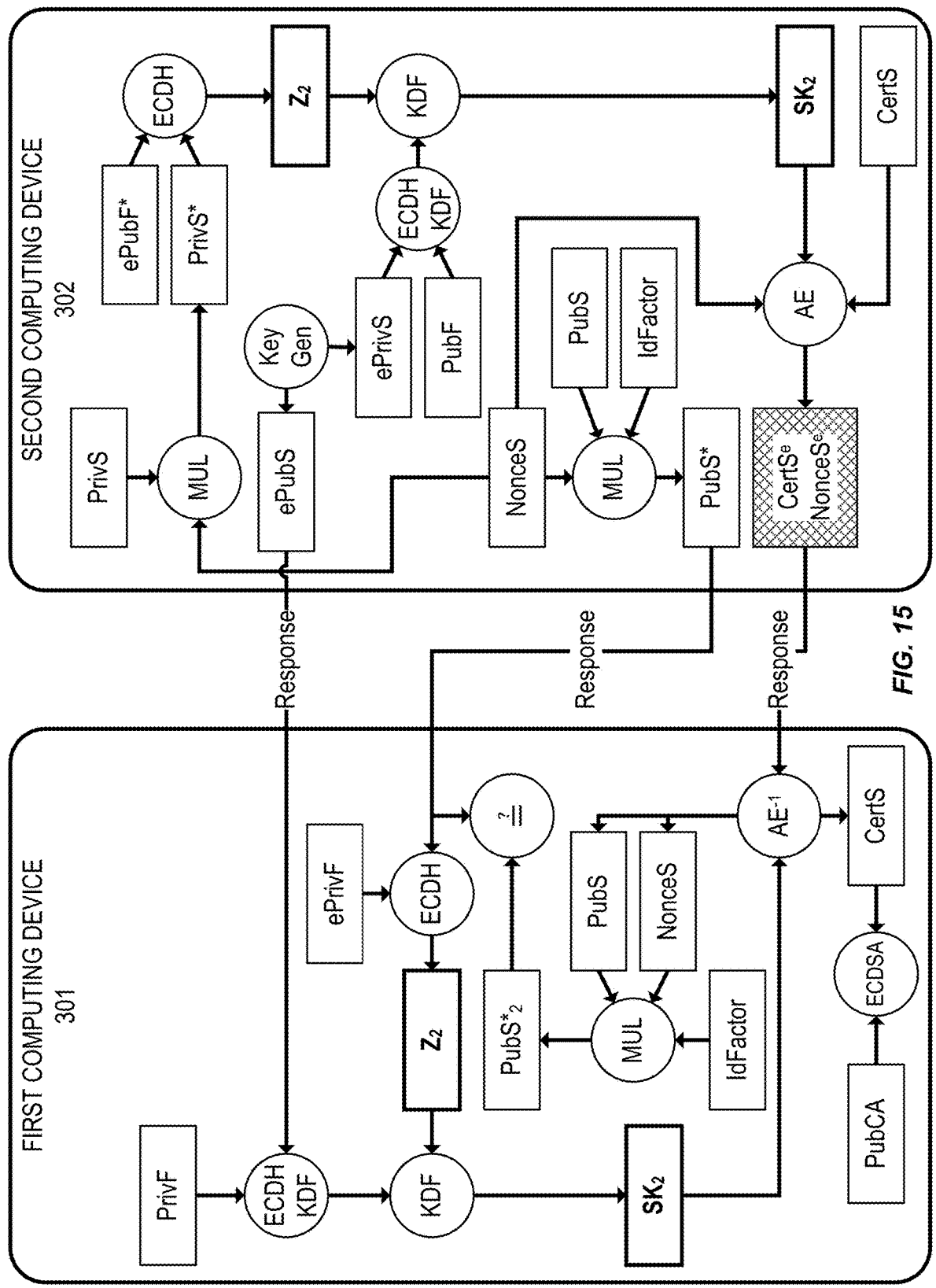
FIG. 15 shows a data flow diagram illustrating operations performed in a second method of generating, transmitting, and processing an authentication response message in accordance with some embodiments.

FIGS. 14 and 15 are data flow diagrams illustrating the computation and transmission of various data elements in accordance with some embodiments of the invention. As shown in FIGS. 8 and 9, a rectangular box indicates a data element (e.g., an identification factor), and a circle indicates an operation to be performed (e.g., key generation). Each arrow into a circle indicates an operand for the corresponding operator, and each arrow out of a circle indicates a result of the corresponding operator. However, it should be noted that some embodiments may not use all shown operands for an operation, and some embodiments may use additional operands for the operations shown. In addition, embodiments may not necessarily perform all shown operations, and/or may perform additional operations that are not shown in FIGS. 14 and 15.

A. Authentication Request Message

FIG. 15 shows a data flow diagram illustrating operations performed in a second method of generating, transmitting, and processing an authentication request message in accordance with some embodiments.

As shown in FIG. 15, first computing device 301 uses a public/private key pair generator (KeyGen) to generate an ephemeral first device public key (ePubF) and an ephemeral first device private key (ePrivF). The ephemeral first device public key (ePubF) is combined with an identification factor (IdFactor) to generate a combined ephemeral first device public key (ePubF). Similarly, the ephemeral first device private key (ePrivF) is combined with the identification factor (IdFactor) to generate a combined ephemeral first device private key (ePrivF*). First computing device 301 uses the combined ephemeral first device private key (ePrivF*) and a static second device public key (PubS) as inputs to an elliptic-curve Diffie-Hellman (ECDH) operation to generate a first shared secret ($Z_1$). The first shared secret is used as an input to a key derivation function (KDF) to derive a first session key ($SK_1$). First computing device 301 encrypts a first device identifier (IdF), and identification data (IdData) using the first session key ($SK_1$) by means of an authenticated encryption (AE) algorithm, resulting in encrypted request data. The encrypted request data, the combined ephemeral first device public key (ePubF*), and a first device certificate (CertF) are sent to the second computing device 302 in a request message.

Once second computing device 302 receives the request message, second computing device 302 generates the first shared secret ($Z_1$) using the received combined ephemeral first device public key (ePubF*) and a static second device private key (PrivS). A key derivation function (KDF) is used to derive the first session key ($SK_1$) using the first shared secret. Second computing device 302 then decrypts the encrypted request data using the first session key ($SK_1$) to determine the identification data (IdData) and the first device identifier (IdF). The first device identifier (IdF) can be used to retrieve (Lookup) identification data ($IdData_2$) previously stored for first computing device 301. If the retrieved identification data ($IdData_2$) and the decrypted identification data (IdData) match, authentication of first computing device 301 may be successful. Otherwise, authentication may fail.

In addition, second computing device 302 verifies the first device certificate (CertF) using a digital signature algorithm (ECDSA) and a public key of a trusted certificate authority (PubCA). In some embodiments, a successful authentication of first computing device 301 may require both verification of the identification data (IdData) and the first device certificate (CertF).

B. Authentication Response Message

Figure 16:
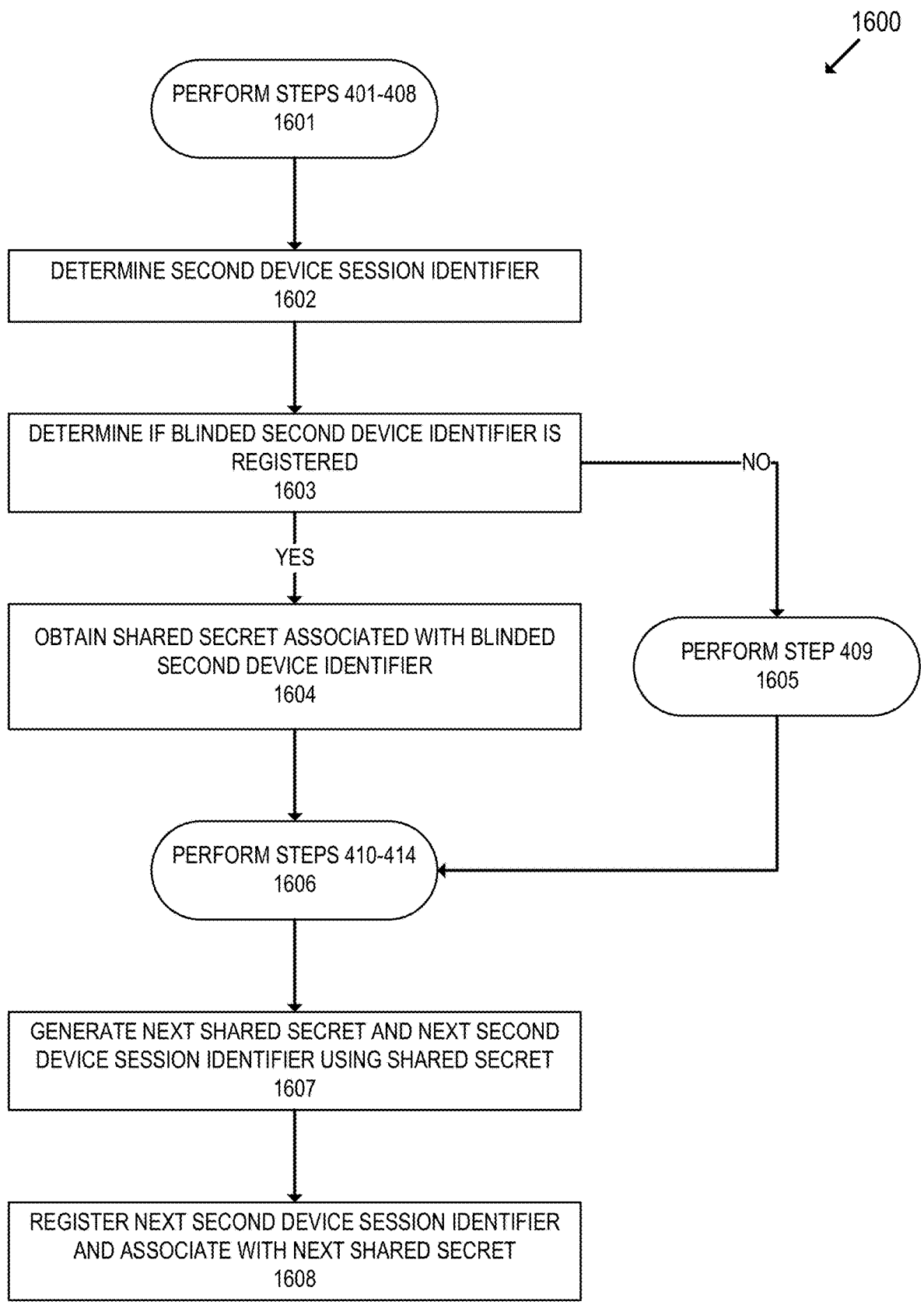
FIG. 16 shows an optimized method of securely authenticating to a second computing device and obtaining response data from the second computing device in accordance with some embodiments.

FIG. 16 shows a data flow diagram illustrating operations performed in a second method of generating, transmitting, and processing an authentication response message in accordance with some embodiments.

As shown in FIG. 16, second computing device 302 combines (MUL) a static second device private key (PrivS) with a cryptographic nonce (NonceS) to generate a blinded static second device private key (PrivS*). Similarly, a static second device public key (PubS) is combined (MUL) with the cryptographic nonce (NonceS) and an identification factor (IdFactor) to generate a blinded static second device public key (PubS*).

The blinded static second device private key (ePrivS*) and a combined ephemeral first device public key (ePubF*), which may have been received in a request message in accordance with FIG. 15, are combined using an elliptic curve Diffie-Hellman (ECDH) operation to determine a second shared secret ($Z_2$).

In addition, second computing device 302 uses a public/private key pair generator (KeyGen) to generate an ephemeral second device public key (ePubS) and an ephemeral second device private key (ePrivS). The ephemeral second device private key (ePrivS), and a static first device public key (PubF), which may have been extracted from the first device certificate (CertF) of FIG. 15, are then combined using an elliptic curve Diffie-Hellman (ECDH) algorithm to determine an auxiliary shared secret.

The auxiliary shared secret and the second shared secret ($Z_2$) are used with a key derivation function (KDF) to determine a second session key ($SK_2$). Second computing device 302 encrypts the cryptographic nonce (NonceS), and a second device certificate (CertS) to determine encrypted response data. Second computing device 302 then sends a response message including the encrypted response data, the blinded static second device public key (PubS*), and the ephemeral second device public key, to first computing device 301.

Once first computing device 301 receives the response message, first computing device 301 uses the received blinded static second device public key (PubS*) and an ephemeral private key (ePrivF), which may have been generated in accordance with FIG. 15, to generate a second shared secret ($Z_2$) using an elliptic curve Diffie-Hellman (ECDH) algorithm. In addition, the first computing device 301 uses the received ephemeral second device public key (ePubS) and a static first device private key (PrivF) that may be maintained on first computing device 301, as inputs to an elliptic curve Diffie-Hellman (ECDH) algorithm that generates an auxiliary shared secret.

A key derivation function (KDF) may be used to generate a second session key ($SK_2$) using the auxiliary shared secret and the second shared secret ($Z_2$). Second computing device 302 then decrypts the encrypted response data using the second session key ($SK_2$) to determine the second device certificate (CertS), the cryptographic nonce (NonceS), and the static second device public key (PubS), which may be extracted from the second device certificate (CertS).

Second computing device 302 can combine (MUL) the cryptographic nonce (NonceS) and the static second device public key (PubS) to generate a second device session identifier ($PubS^*_2$). The second device session identifier ($PubS^*_2$) is then compared to the blinded static second device public key ($PubS^*$) received from second computing device 302. Authentication may require the second device session identifier ($PubS^*_2$) and the blinded static second device public key ($PubS^*$) to match.

In addition, second computing device 302 verifies the second device certificate (CertS) using an elliptic curve digital signature algorithm (ECDSA) and a public key of a trusted certificate authority (PubCA). In some embodiments, authentication may require both the verification of the blinded static second device public key ($PubS^*$) and the second device certificate (CertS).

VI. Optimized Authenticated Communication Methods

In some embodiments of the invention, a first computing device 301 and a second computing device 302 may each maintain a registry of devices with which communication occurred in the past. Each registered device may be associated with a next shared secret and/or other data to be used in a future communication session with the registered device. In this manner, embodiments can avoid certain operations, such as a Diffie-Hellman key agreement, in any subsequent communication between two devices. Thus, embodiments can reduce the amount of time and processing needed to establish communication sessions. In addition, embodiments can achieve these benefits while protecting the identity of second computing device 302, as will be described in further detail below.

A. First Computing Device

FIG. 16 shows an optimized method 1600 of securely authenticating to a second computing device 302 and obtaining response data from second computing device 302 in accordance with some embodiments. In some embodiments, method 1600 may be performed by first computing device 301. However, in other embodiments, some or all steps of method 1600 may be performed by other entities.

At step 1601, steps 401-408 of method 400 are performed. Specifically, an ephemeral key pair including an ephemeral public key and an ephemeral private key is generated. An identification factor is calculated using identification data and authentication data. The ephemeral public key and the ephemeral private key are combined using the identification factor. As a result, a combined ephemeral public key and a combined ephemeral private key may be determined. A first shared secret is generated using the combined ephemeral private key and a static second device public key. A first session key is generated using the first shared secret and first supplementary data. The ephemeral public key, the identification data, and a first device identifier are encrypted using the first session key to generate encrypted request data. An authentication request message including the combined ephemeral public key and the encrypted request data is sent to second computing device 302. An authentication response message including a blinded static second device public key and encrypted response data is then received from second computing device 302. Further description of these steps can be found with reference to the corresponding steps in method 400.

At step 1602, a second device session identifier is determined. In some embodiments, the second device session identifier may be a subset (e.g., the last 4 or 8 bits) of the blinded static second device public key received in the authentication response message.

At step 1603, it is determined if the second device session identifier is registered. For example, in some embodiments, a registry may be searched for the second device session identifier. If so, method 1600 proceeds to step 1604. Otherwise, method 1600 proceeds to step 1605.

If the second device session identifier is registered, at step 1604, a shared secret associated with the second device session identifier is obtained. For example, in some embodiments, the shared secret may be retrieved from a record in the registry associated with the second device session identifier. Method 1600 then proceeds to step 1606.

If the second device session identifier is not registered, at step 1605, step 409 of method 400 is performed. Specifically, a second shared secret is generated using the ephemeral private key and the blinded static second device public key received in the authentication response message.

At step 1606, steps 410-414 of method 400 are performed. Specifically, a second session key is generated using the second shared secret and second supplementary data. The encrypted response data received in the authentication response message is decrypted using the second session key to obtain a cryptographic nonce, a second device certificate chain, and payload data. The second device certificate chain is validated. A transaction is then conducted using the payload data.

At step 1607, a next shared secret and a next second device session identifier are generated using the shared secret. The next shared secret and the next second device session identifier may be generated from the shared secret in any suitable manner. For example, in some embodiments, the next shared secret and the next second device session identifier may be determined using a key derivation function. For instance, the key derivation function used to generate the second session key at step 1606 may also generate the next shared secret.

At step 1608, the next second device session identifier is registered and associated with the next shared secret. For example, in some embodiments, the next second device session identifier and the next shared secret may be stored in a registry or database.

B. Second Computing Device

Figure 17:
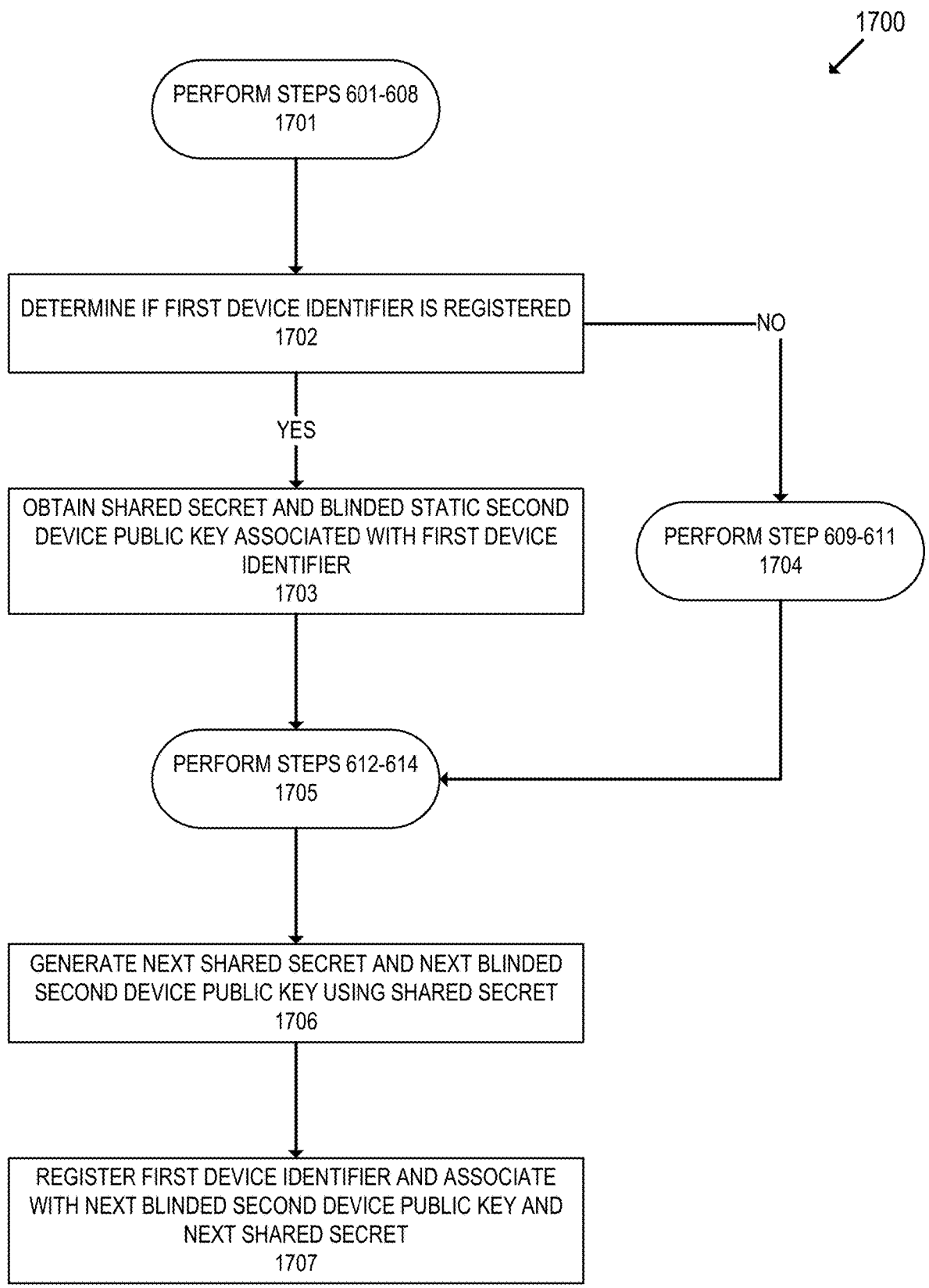
FIG. 17 shows an optimized method of securely processing an authentication request message from a first computing device and providing an authentication response message to the first computing device in accordance with some embodiments.

FIG. 17 shows an optimized method 1700 of securely processing an authentication request message from a first computing device 301 and providing an authentication response message to first computing device 301 in accordance with some embodiments. In some embodiments, method 1700 may be performed by second computing device 302. However, in other embodiments, some or all steps of method 1700 may be performed by other entities.

At step 1701, steps 601-608 of method 600 are performed. Specifically, an authentication request message including a combined ephemeral public key and encrypted request data is received from first computing device 301. A first shared secret is generated using the combined ephemeral public key and a static second device private key. A first session key is generated using the first shared secret and first supplementary data. The encrypted request data is decrypted using the first session key to obtain request data including an ephemeral public key, a first device identifier, and identification data. The identification data is verified using the first device identifier. Authentication data associated with the first device identifier and/or the identification data is retrieved. An identification factor is generated using the retrieved authentication data and the identification data. The combined ephemeral public key is verified using the ephemeral public key and the identification factor. Further description of these steps can be found with reference to the corresponding steps in method 600.

At step 1702, it is determined if the first device identifier is registered. For example, in some embodiments, a registry may be searched for the first device identifier. If so, method 1700 proceeds to step 1703. Otherwise, method 1700 proceeds to step 1704.

If the first device identifier is registered, at step 1703, a shared secret and a blinded static second device public key associated with the first device identifier are obtained. For example, in some embodiments, the shared secret and blinded static second device public key may be retrieved from a record in the registry associated with the first device identifier. Method 1700 then proceeds to step 1705.

If the first device identifier is not registered, at step 1704, steps 709-711 of method 600 are performed. Specifically, a cryptographic nonce is then generated. A static second device public key and the static second device private key are blinded using the cryptographic nonce and the identification factor. A second shared secret is then generated using the blinded static second device private key and the ephemeral public key.

At step 1705, steps 712-714 of method 600 are performed. Specifically, a second session key is generated using the second shared secret and second supplementary data. The cryptographic nonce, a second device certificate chain, and payload data are encrypted using the second session key to generate encrypted response data. An authentication response message including the blinded static second device public key and the encrypted response data is then sent to first computing device 301.

At step 1706, a next shared secret and a next blinded second device public key are generated using the shared secret. The next shared secret and the next blinded second device public key may be generated from the shared secret in any suitable manner. For example, in some embodiments, the next shared secret may be determined using a key derivation function. For instance, the key derivation function used to generate the second session key at step 1705 may also generate the next shared secret.

At step 1707, the first device identifier is registered and associated with the next shared secret and the next blinded second device public key. For example, in some embodiments, the next blinded second device public key and the next shared secret may be stored in a registry or database entry corresponding to the first device identifier.

VII. Pseudocode Listings

Tables 1 and 2 below show pseudocode listings to implement secure methods for authenticated data communication in accordance with some embodiments of the invention.

A. First Computing Device

TABLE 1

| Line | Pseudo-code |
|---|---|
| | Optional Values: AuthData$_F$, IdData$_F$, C$_S$, PB registry, CipherSpec, d$_{sF}$, C$_F$ |
| | Required Values: ID$_{sF}$, CB$_F$ |
| F1 | If (IdData$_F$ and not C$_S$) IdData = NULL |
| F2 | (d$_{eF}$; Q$_{eF}$) = ECkeyGen (same curve as C$_S$) |
| F3 | If (IdData$_F$ or AuthData$_F$) |
| F4 |    IdFactor = T$_4$[Hash(IdData$_F$ || AuthData$_F$)] |
| F5 | Else IdFactor = 1 |
| F6 | Q$_{eF}$* = IdFactor · Q$_{eF}$ |
| F7 | If (AuthData$_F$) CB$_F$ |= UseAuthData |
| F8 | If (C$_S$) |
| F9 |    Authenticate C$_S$, Extract Q$_{sS}$, Cfps |
| F10 |    Z$_1$ = EC_DH (IdFactor · d$_{eF}$ ; Q$_{sS}$) |
| F11 |    SK$_1$ = KDF (Z$_1$, len, info (ID$_{sS}$, T$_{16}$(Q$_{eF}$*))) |
| F12 |    EncData$_F$ = AE (SK$_1$, "KC_0_V" || ID$_{sF}$ || CB$_F$ || CipherSpec || IdData || C$_F$) |
| F13 |    CData = OPTY || Cfps || Q$_{eF}$* || EncData$_F$ |
| F14 | Else |
| F15 |    CData = ID$_{sF}$ || Q$_{eF}$* || CB$_F$ || CipherSpec |
| F16 | Send CData |
| | wait for response: BData$_S$ Q$_{eS}$ EncData$_S$ |
| F17 | Check BData$_S$, Q$_{eS}$ belong to EC domain |
| F18 | ID$_{sS}$ = (T$_8$(BData$_S$)); |
| F19 | Look for ID$_{sS}$ in PB registry |
| F20 | If ID$_{sS}$ is not registered |
| F21 |    If Q$_{sF}$ |
| F22 |      Z$_{aux}$= EC_DH (d$_{sF}$ ; Q$_{eS}$) |
| F23 |      K$_{aux}$ = KDF (Z$_2$, len, info(ID$_{sF}$, T$_{16}$(Q$_{eS}$))) |
| F24 |    Else |
| F25 |      K$_{aux}$ = NULL |
| F26 |    Z$_2$ = EC_DH (d$_{eF}$; BData$_S$) |
| F27 |    Zeroize d$_{eF}$ |
| F28 | Else |
| F29 |    Obtain Z$_2$ from ID$_{sS}$ in PB registry. |
| F30 | SK$_{CFRM}$ || SK$_{MAC}$ || SK$_{ENC}$ || SK$_{RMAC}$ || Next$_Z$ || NextBlind = KDF (Z$_2$, len, info(ID$_{sS}$, ID$_{sF}$, T$_{16}$(Q$_{eF}$), K$_{aux}$)) |

TABLE 1-continued

| Line | Pseudo-code |
|---|---|
| F31 | Zeroize $Z_2$, $K_{aux}$ |
| F32 | Header || $C_S$ || $N_S$ || $CB_S$ || $NewC_S$ || NewCipherSpec || Payload = $AE^{-1}$ ($SK_{CFRM}$; $EncData_S$) |
| F33 | Verify Header == "KC_1_V", Verify $CB_S$. If error, restart protocol w/ correct params |
| F34 | Zeroize $SK_{CFRM}$ |
| F35 | If ($CB_S$ & PB_INIT) or ($CB_S$ & NO_PB) or ($ID_{sS}$ entry not found in registry) |
| F36 | Verify $C_S$ signature using ECDSA |
| F37 | Extract $Q_{sS}$ from $C_S$ |
| F38 | Verify $BData_S$ == $T_4(N_S) \cdot Q_{sS}$ |
| F39 | If ($CB_S$ & PB_INIT) or ($CB_S$ & PB) |
| F40 | $NextID_{sS}$ = ($T_8$(NextBlind $\cdot Q_{sS}$)); |
| F41 | Register Z=NextZ for new entry $ID_{sS}$= $NextID_{sS}$ |

Table 1 shows a pseudocode listing to implement a method of securely authenticating and obtaining response data in accordance with some embodiments. Some of the steps described below may be in reference to a first computing device 301 in communication with a second computing device 302. However, in embodiments of the invention, some or all of the steps may be performed by another suitable entity.

Prior to the method, first computing device 301 may optionally maintain one or more data elements, such as authentication data (AuthDataF), identification data (IdData$_F$), a second device certificate (Cs), a persistent binding registry (PB registry), a cipher suite specification (CipherSpec), a static first device private key ($d_{sF}$), and/or a first device certificate ($C_F$).

In addition, in some embodiments, first computing device 301 may be required to maintain a first device identifier ($ID_{sF}$), and a first device control byte ($CB_F$) indicating protocol data for a communication.

At step F1, if identification data is maintained, but a second device certificate is not available, then the identification data is nullified. In other words, the identification data will not be transmitted in a request message.

At step F2, an ephemeral first device key pair is generated. The ephemeral first device key pair includes an ephemeral first device private key ($d_{eF}$), and an ephemeral first device public key ($Q_{eF}$). In embodiments that use elliptic curve keys, the ephemeral keys may be generated on the same curve as the second device certificate (if available).

At step F3, a check is performed to determine if either identification data or authentication data is available. If either is available, then at step F4 an identification factor (IdFactor) is generated by hashing the combination of the identification data and the authentication data, and taking the most significant four bytes (T4) of the result. Otherwise, at step F5, the identification factor is assigned to 1 (i.e., the multiplicative identity).

At step F6, a combined ephemeral first device public key ($Q_{eF}$*) is calculated by determining the point multiplication product of the identification factor and the ephemeral first device public key.

At step F7, if authentication data is available, the first device control byte is modified to indicate that authentication data should be used to authenticate first computing device 301.

At step F8, a check is performed to determine if the second device certificate is available. If the second device certificate is available, then steps F9-F13 are performed. Otherwise, the method proceeds to step 14.

At step F9, the second device certificate is authenticated (e.g., its digital signature may be validated). Once authenticated, a static second device public key ($Q_{sS}$), and a second device certificate identifier (Cfps) are extracted from the second device certificate.

At step F10, a first shared secret ($Z_1$) is generated using an elliptic curve Diffie-Hellman (ECDH) algorithm. The inputs to the ECDH algorithm are a combined ephemeral first device private key (generated from the identification factor and the ephemeral first device private key), and the static second device public key.

At step F11, a first session key ($SK_1$) is derived using a key derivation function (KDF). The inputs to the KDF are the first shared secret, a desired output length (len), and a combination of the second device identifier ($ID_{sS}$) and the most significant 16 bytes ($T_{16}$) of the combined ephemeral first device public key.

At step F12, the first session key is used to generate encrypted request data (EncData$_F$) using an authenticated encryption (AE) algorithm. The request data includes a pre-defined header ("KC_0_V"), a first device identifier, a first device control byte, a cipher suite specification, identification data, and a first device certificate.

At step F13, a request message (CData) is formed using a pre-defined value (OPTY), the second device certificate identifier, the combined ephemeral first device public key, and the encrypted data.

At step F14, if the second device certificate is not available, then at step F15, the request message is formed using the first device identifier, the combined ephemeral first device public key, the first device control byte, and the cipher suite specification.

At step F16, the request message is sent.

After step F16, a wait occurs until a response message is received. The response message includes a blinded static second device public key (BData$_S$), an ephemeral second device public key ($Q_{eS}$), which may be missing, and encrypted response data (EncData$_S$).

At step F17, the blinded static second device public key and the ephemeral second device public key are checked to ensure that they belong to an appropriate elliptic curve domain.

At step F18, a second device session identifier ($ID_{sS}$) is determined by taking the first 8 bytes ($T_8$) of the blinded static second device public key.

At step F19, the persistent binding registry is inspected to determine if an entry exists for the second device session identifier. At step F20, a check is performed to determine if the second device session identifier is registered. If so, the method proceeds to step F21. Otherwise, the method proceeds to step F28.

At step F21, a check performed to determine if a static first device public key ($Q_{sF}$) is available. If so, steps F22 and F23 are performed. Otherwise, the method proceeds to step F24.

At step F22, an auxiliary shared secret ($Z_{aux}$) is determined using an ECDH algorithm. The inputs to the ECDH algorithm include the static first device private key and the ephemeral second device public key.

At step F23, an auxiliary session key ($SK_{aux}$) is derived using a key derivation function. The inputs to the key derivation function include the auxiliary shared secret, a desired key length, and a combination of the first device identifier and the first 16 bytes of the ephemeral second device public key. The method then proceeds to step F26.

At step F24, if a static first device public key is not available, the auxiliary shared secret is set to a NULL value at step F25.

At step F26, a second shared secret ($Z_2$) is generated using the ephemeral first device private key and the blinded static second device public key.

At step F27, the ephemeral first device private key is zeroized. Zeroization may include, for example, a secure and thorough deletion of a value. The method then proceeds to step F30.

At step F28, if the second device session identifier is registered, then the second shared secret is retrieved from the persistent binding registry.

At step F30, a second session key ($SK_{CFRM}$), several other keys ($SK_{MAC}$, $SK_{ENC}$, $SK_{RMAC}$), a next shared secret (NextZ), and a next blinding factor (NextBlind), are generated using a key derivation function (KDF). The inputs to the KDF include the second shared secret, the desired key length, the auxiliary session key, and a combination of other data such as a second device identifier, a first device identifier, and the first 16 bytes of the ephemeral first device public key.

At step F31, the second session key and the auxiliary session key are zeroized.

At step F32, the second session key is used to decrypt ($AE^{-1}$) the encrypted response data. The resulting response data includes a pre-defined header (Header), a second device certificate, a cryptographic nonce ($N_S$), a second device control byte ($CB_S$), a new second device certificate ($NewC_S$) to be used in future communication, a new cipher suite specification (NewCipherSpec) to be used in future communication, and a payload (Payload).

At step F33, the pre-defined header is verified by checking that it matches an expected value. The second device control byte is also verified At step F34, the second session key is zeroized.

At step F35, a check is performed to determine if the server control byte indicates that persistent binding should be reestablished, if the server control byte indicates that persistent binding is not supported, or if the second device session identifier is not found in the registry. If any of the above are true, the method proceeds to steps F36-F38. Otherwise, the method proceeds to step F39.

At step F36, the digital signature of the second device certificate is verified using an elliptic curve digital signature algorithm (ECDSA).

At step F37, the static second device public key ($Q_{sS}$) is extracted from the second device certificate.

At step F38, the blinded static second device public key is verified by recomputing it using the first four digits of the cryptographic nonce, and the static second device public key.

At step F39, if the server control byte indicates that persistent binding is to be initialized or otherwise performed, steps F40 and F41 are performed.

At step F40, a next second device session identifier ($NextId_{sS}$) is calculated by taking the first 8 bytes of the point multiplication product of the next blinding factor and the static second device public key.

At step F41, the next second device session identifier is registered and associated with the next shared secret.

B. Second Computing Device

TABLE 2

| Line | Pseudo-code |
|---|---|
|  | Optional Values: $AuthData_S$, PB registry, Payload |
|  | Required Values: $Q_{sS}$, $d_{sS}$, $CB_S$, CSList, CertList |
| S1 | Receive request message: CData = [OPTY ‖ Cfps ‖ $Q_{eF}$* ‖ $EncDataF$] or CData = [$ID_{sF}$ ‖ $Q_{eF}$* ‖ $CB_F$ ‖ CipherSpec] |
| S2 | If $T_4$(CData) == OPTY |
| S3 | OPTY ‖ Cfps ‖ $Q_{eF}$* $EncData_F$ = CData |
| S4 | Get $C_S$ from Cfps and CertList: locate $d_{sS}$ |
| S5 | $Z_1$ = EC_DH ($Q_{eF}$*; $d_{sS}$) |
| S6 | $SK_1$ = KDF ($Z_1$, len, info($ID_{sS}$, $T_{16}$($Q_{eF}$*))) |
| S7 | "KC_0_V" ‖ $ID_{sF}$ ‖ $CB_F$ ‖ CipherSpec ‖ $IdData_F$ ‖ $C_F$ = $AE^{-1}$ ($SK_1$; $EncData_F$) |
| S8 | Else |
| S9 | $ID_{sF}$ ‖ $Q_{eF}$* ‖ $CB_F$ ‖ CipherSpec = CData |
| S10 | If $IdData_F$ and (Authenticate ($IdData_F$) for $ID_{sF}$) fails |
| S11 | return RData ($CB_S$ = AUTH_FAIL) |
| S12 | If ($CB_F$ & UseAuthData) Find $AuthData_S$ for $ID_{sF}$ |
| S13 | If (($CB_F$ & UseAuthData and no $ID_{sF}$) or (no $AuthData_S$ for $ID_{sF}$)) |
| S14 | return RData ($CB_S$ = AUTH_FAIL) |
| S15 | If (CipherSpec not supported) |
| S16 | return RData ($CB_S$ ǀ= INVALID_CS) |
| S17 | If (CipherSpec is insufficient or not allowed) |
| S18 | $CB_S$ ǀ= CHANGE_$C_S$ |
| S19 | NewCipherSpec = CSList |
| S20 | $NewC_S$ = CertList |
| S21 | Else NewCipherSpec = CipherSpec; $NewC_S$ = $C_S$ |
|  | prepare response message |
| S22 | If($C_F$) |
| S23 | Extract $Q_{sF}$; Validate $Q_{sF}$ belongs to the correct domain |
| S24 | GEN_KEY_PAIR ($d_{eS}$; $Q_{eS}$) |
| S25 | Else $Q_{eS}$ = NULL |
| S26 | $CB_S$ = $CB_F$ & 'F0' |
| S27 | Generate Nonce $N_S$ |
| S28 | If [($ID_{sF}$ is not registered) or (($CB_F$ & '0F') != PB)] |

TABLE 2-continued

| Line | Pseudo-code |
|---|---|
| S29 | Validate $Q_{eF}$ belongs to EC domain |
| S30 | If ($IdData_S$ or $AuthData_S$) |
| S31 |    IdFactor = $T_4$[Hash($MatchData_S$ \|\| $AuthData_S$)] |
| S32 |    If ($Q_{eF}^{*}$ != IdFactor · $Q_{eF}$) return RData ($CB_S$ = AUTH_FAIL) |
| S33 | Else IdFactor = 1 |
| S34 | If ($Q_{sF}$) |
| S35 |    $Z_{aux}$ = EC_DH ($d_{eS}$; $Q_{sF}$) |
| S36 |    $K_{aux}$ = KDF ($Z_{aux}$, len, info($IDS_F$, $T_{16}(Q_{eS})$)) |
| S37 | Else $K_{aux}$ = NULL |
| S38 | $Z_2$ = EC_DH ($T_4(N_S) · d_{sS}$, $Q_{eF}^{*}$) |
| S39 | $BData_S$ = IdFactor · [$T_4(N_S) · Q_{sS}$] |
| S40 | Else |
| S41 |    Read $Z_2$, $BData_S$ from PB registry entry for $ID_{sF}$ |
| S42 |    $CB_S$ \|= PB |
| S43 | $ID_{sS}$ = $T_8(BData_S)$; |
| S44 | $SK_{CFRM}$ \|\| $SK_{MAC}$ \|\| $SK_{ENC}$ \|\| $SK_{RMAC}$ \|\| NextZ \|\| NextBlind = KDF ($Z_2$, len, info ($ID_{sS}$, $ID_{sF}$, $T_{16}(Q_{eF})$, $K_{aux}$)) |
| S45 | Zeroize $Z_2$, $K_{aux}$ |
| S46 | If ((both devices support PB) and ($ID_{sF}$ is not registered OR ($CB_F$ & PB_INIT)) |
| S47 |    Register Z=NextZ and $NextBData_S$ = NextBlind · $Q_{sS}$ for $ID_{sF}$ |
| S48 |    $CB_S$ \|= PB_INIT |
| S49 | Else |
| S50 |    $CB_S$ \|= NO_PB |
| S51 | $EncData_S$ = AE ($SK_{CFRM}$; "KC_1_V" \|\| $N_S$ \|\| $CB_S$ \|\| $NewC_S$ \|\| NewCipherSpec \|\| Payload) |
| S52 | Zeroize $SK_{CFRM}$ |
| S53 | Return RData = $BData_S$ \|\| $Q_{eS}$ \|\| $EncData_S$ |

Table 2 shows a pseudocode listing to implement a method of securely processing an authentication request message and providing an authentication response message in accordance with some embodiments. Some of the steps described below may be in reference to a second computing device 302 in communication with a first computing device 301. However, in embodiments of the invention, some or all of the steps may be performed by another suitable entity.

Prior to the method, second computing device 302 may optionally maintain one or more data elements, such as authentication data ($AuthData_S$) for the first computing device 301 or an associated user, a persistent binding (PB) registry, and/or a data payload (Payload), which may also be determined in response to a request message.

In addition, in some embodiments, second computing device 302 may be required to maintain or have access to a static second device key pair including a static second device public key ($Q_{sS}$) and a static second device private key ($d_{sS}$), a second device control byte (CBs) indicating protocol data, a list of cipher suite preferences (CSList), and/or a list of certificates (CertList) that may be used to communicate with second computing device 302.

At step S1, a request message (CData) is received. The request message may include a pre-defined value indicating the presence of encrypted data (OPTY), a second device certificate identifier (Cfps), a combined ephemeral first device public key ($Q_{eF}^{*}$), and encrypted request data ($EncData_F$). Alternatively, in some cases, the request message may include a first device identifier ($ID_{sF}$), the combined ephemeral first device public key, a first device control byte ($CB_F$), and a cipher suite specification (CipherSpec).

At step S2, the first four bytes ($T_4$) of the request message are inspected to determine if they include the pre-defined value. If so, the method proceeds to step S3. Otherwise, the method proceeds to step S8.

At step S3, the data elements of the request message are isolated. Specifically, since the request message included the pre-defined value, the second device certificate identifier, the combined ephemeral first device public key, and the encrypted request data ($EncData_F$) are determined.

At step S4, the second device certificate identifier and the list of certificates are used to retrieve a second device certificate associated with the request message. In addition, a static second device private key corresponding to the retrieved certificate can be determined.

At step S5, a first shared secret ($Z_1$) is generated using an elliptic curve Diffie-Hellman (ECDH) algorithm. The inputs to the algorithm include the received combined ephemeral first device public key and the static second device private key.

At step S6, a first session key ($SK_1$) is derived using a key derivation function (KDF). The inputs to the KDF include the first shared secret, a desired key length (len), and a combination of the second device session identifier ($ID_{sS}$) and the first 16 bytes ($T_{16}$) of the combined ephemeral first device public key.

At step S7, the first session key is used to decrypt the encrypted request data using an authenticated decryption ($AE^{-1}$) function. The resulting request data includes a pre-defined header string ("KC_0_V") with an expected value, a first device identifier, a first device control byte, a cipher suite specification, identification data ($IdData_F$), and optionally a first device certificate ($C_F$). The method then proceeds to step S10.

At step S8, if the first four bytes of the request message do not include the pre-defined value, then at step S9 the data elements in the request message are isolated. Specifically, the first device identifier, the combined ephemeral first device public key, the first device control byte, and the cipher suite specification are determined.

At step S10, if identification data was determined from the first device, and authentication of the identification data fails, then at step S11a response message is returned including a control byte indicating that authentication has failed.

At step S12, if the first device control byte indicates that authentication data was used in generating the request message, then authentication data ($AuthData_S$) is retrieved using the first device identifier. For example, the authentication data may be retrieved from a device database.

At step S13, if the authentication data could not be successfully retrieved (e.g., no first device identifier available or no authentication data is available for the first device identifier), then at step S14 a response message is returned including a control byte indicating that authentication has failed.

At step S15, if the cipher suite specification determined from the request message is not supported, then at step S16 a response message is returned including a control byte indicating that the cipher suite is invalid.

At step S17, if the cipher suite specification is insufficient or not allowed, then the method proceeds to steps S18-S20.

At step S18, the second device control byte is modified to indicate that the cipher suite is to be changed. At step S19, a new cipher suite specification (NewCipherSpec) is set to the list of cipher suite preferences. At step S20, a new second device certificate (NewCs) is set to the list of certificates that may be used in communication. The method then proceeds to step S22.

At step S21, if the cipher suite specification is sufficient and allowed, then the new cipher suite specification is the same as the (current) cipher suite specification, and the new second device certificate is the same as the (current) second device certificate.

Steps after step S21 generally relate to forming and sending the response message. Such steps may use the cipher suite specification and server certificate determinations previously made. For example, if at step S20 a new second device certificate is to be used in forming the response message, any reference to the static second device public key ($Q_{sS}$) or the static second device private key ($d_{sS}$) may refer to those corresponding to the new second device certificate, as opposed to keys corresponding to the second device certificate associated with the request message.

At step S22, if a first device certificate was determined from the request message, then the method proceeds to steps S23 and S24. Otherwise, the method proceeds to step S25.

At step S23, a static first device public key ($Q_{sF}$) is extracted from the first device certificate. The static first device public key is validated to ensure that it belongs to the correct elliptic curve domain.

At step S24, an ephemeral second device key pair is generated. The ephemeral second device key pair comprises an ephemeral second device private key ($d_{eS}$) and an ephemeral second device public key ($Q_{eS}$). The method then proceeds to step S26.

At step S25, if a first device certificate was not determined from the request message, then the ephemeral second device public key is set to a null value.

At step S26, the second device control byte is prepared using the first device control byte.

At step S27, a cryptographic nonce ($N_S$) is generated.

At step S28, it is determined whether (1) the first device identifier is not registered, or (2) if the first device control byte indicates that persistent binding is not requested. If either of these two conditions is false, then the method proceeds to step S29. Otherwise, if both of these conditions are true, then the method proceeds to step S39.

At step S29, the ephemeral first device public key is validated to ensure that it belongs to the correct elliptic curve domain.

At step S30, a check is performed to determine if either identification data or authentication data is available. If either is available, then the method proceeds to step S31. Otherwise, the method proceeds to step S33.

At step S31 an identification factor (IdFactor) is generated by hashing the combination of the identification data and the authentication data, and taking the most significant four bytes (T4) of the result At step S32, a combined ephemeral first device public key is recomputed using the ephemeral first device public key and the identification factor. If the recomputed key and the received key do not match, then a response message is returned including a control byte indicating that authentication failed.

At step S33, if neither identification data or authentication data is available, the identification factor is set to 1 (i.e., the multiplicative identity).

At step S34, if a static first device public key is available, then the method proceeds to steps S35-S36. Otherwise, the method proceeds to step S37.

At step S35, an auxiliary shared secret ($Z_{aux}$) is computed an ECDH algorithm with the ephemeral second device private key and the static first device public key as inputs. At step S36, an auxiliary session key ($K_{aux}$) is derived using a KDF with the auxiliary shared secret, a desired key length, and a combination of the first device identifier, and the first 16 bytes of the ephemeral second device public key as inputs. The method then proceeds to step S38.

At step S37, if a static first device public key is not available, then the auxiliary session key is set to a null value.

At step S38, a second shared secret ($Z_2$) is calculated using an ECDH algorithm. A first input to the ECDH algorithm includes a combination of the first four bytes of the cryptographic nonce and the static second device private key. A second input to the ECDH algorithm includes the combined ephemeral first device public key.

At step S39, a blinded static second device public key (BData$_S$) is calculated by combining the identification factor, the first four bytes of the cryptographic nonce, and the static second device public key. The method then proceeds to step S43.

At step S40, if the first device identifier is registered and the first device control byte indicates that persistent binding is requested, then the method proceeds to steps S41 and S42. Otherwise the method proceeds to step S43.

At step S41, the second shared secret and the blinded static second device public key are read from a persistent binding registry entry corresponding to the first device identifier. At step S42, the second device control byte is modified to indicate that persistent binding is enabled.

At step S43, a second device session identifier (ID$_{sS}$) is calculated by taking the first eight bytes of the blinded static second device public key.

At step S44, a second session key ($SK_{CFRM}$), several other keys ($SK_{MAC}$, $SK_{ENC}$, $SK_{RMAC}$), a next shared secret (NextZ), and a next blinding factor (NextBlind), are generated using a key derivation function (KDF). The inputs to the KDF include the second shared secret, the desired key length, the auxiliary session key, and a combination of other data such as the second device session identifier, the first device identifier, and the first 16 bytes of the ephemeral first device public key.

At step S45, the second shared secret and the auxiliary session key are zeroized.

At step S46, if both first computing device 301 and second computing device 302 support persistent binding, and either the first device identifier is not registered or the first device control byte indicates that persistent binding should be initialized, then the method proceeds to steps S47-S48. Otherwise, the method proceeds to step S49.

At step S47, a next blinded static second device public key (NextBData$_S$) is determined by combining the next blinding factor and the static second device public key. The first device identifier is then registered and associated with the next shared secret and the next blinded static second device public key. At step S48, the second device control byte is modified to indicate that persistent binding is to be initialized. The method then proceeds to step S51.

At step S49, if the condition of step S46 is not true, then at step S50 the second device control byte is modified to indicate that persistent binding has not been used for the response message.

At step S51, the second session key is used to generate encrypted response data (EncData$_S$) using an authenticated encryption (AE) function. The response data includes a pre-defined header ("KC_1_V"), the cryptographic nonce, the second device control byte, the second device certificate, the new second device certificate, the new cipher suite specification, and the payload. The payload may include any suitable data.

At step S52, the second session key is zeroized.

At step S53, a response message (RData) including the blinded static second device public key, the ephemeral second device public key, and the encrypted response data is sent.

VIII. Computer Apparatuses

Figure 18:
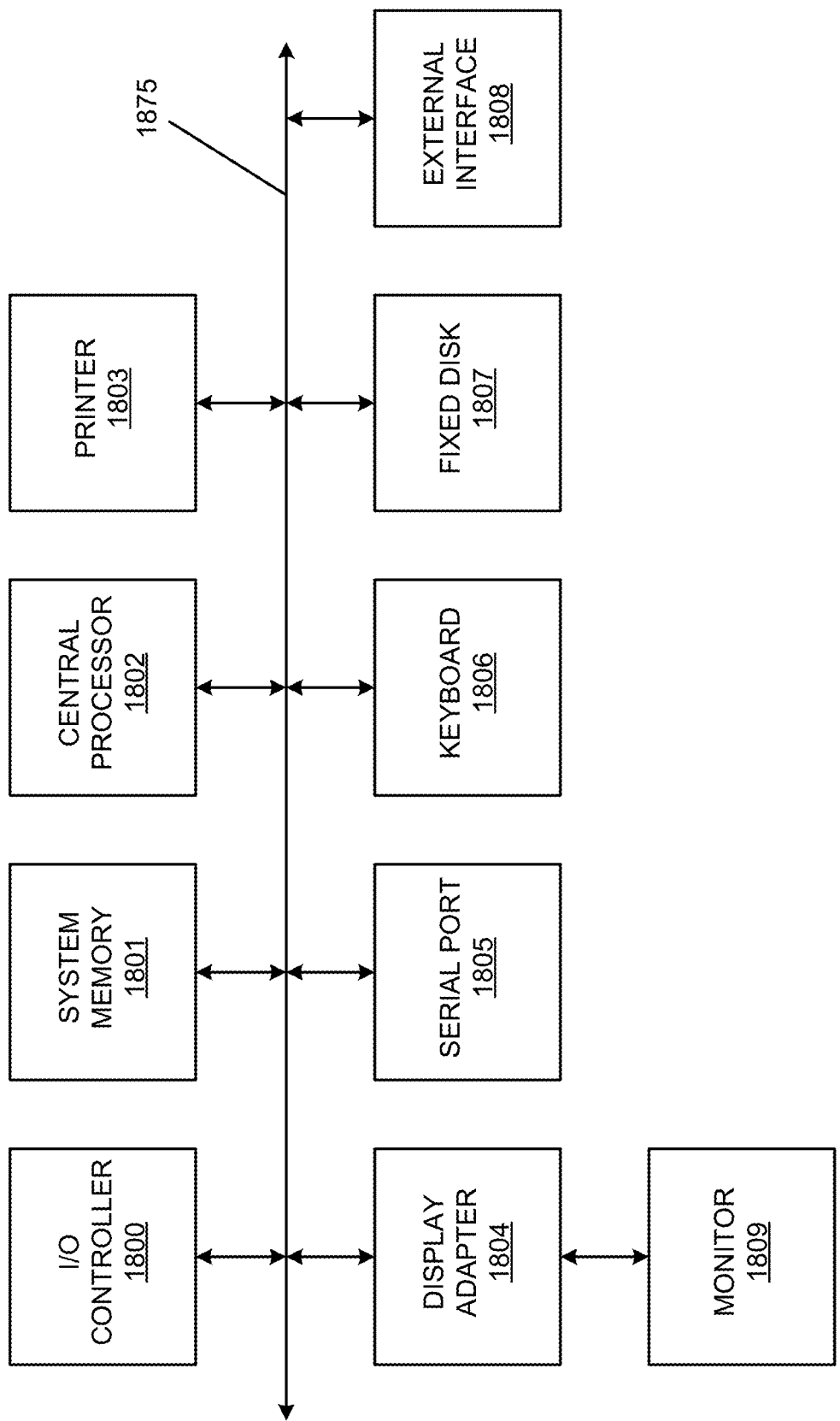
FIG. 18 shows a block diagram of an exemplary computer apparatus.

FIG. 18 shows a block diagram of an exemplary computer apparatus. is a high level block diagram of a computer system that may be used to implement any of the entities or components described above. The subsystems shown in FIG. 18 are interconnected via a system bus 1875. Additional subsystems include a printer 1803, keyboard 1806, fixed disk 1807, and monitor 1809, which is coupled to display adapter 1804. Peripherals and input/output (I/O) devices, which couple to I/O controller 1800, can be connected to the computer system by any number of means known in the art, such as a serial port. For example, serial port 1805 or external interface 1808 can be used to connect the computer apparatus to a wide area network such as the Internet, a mouse input device, or a scanner. The interconnection via system bus 1875 allows the central processor 1802 to communicate with each subsystem and to control the execution of instructions from system memory 1801 or the fixed disk 1807, as well as the exchange of information between subsystems. The system memory 1801 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A system comprising a first computing device for communicating with a second computing device, the first computing device comprising:
   a processor;
   a memory; and
   a non-transitory computer-readable storage medium comprising instructions stored thereon, that, when executed on the processor, cause the processor to perform:
   storing, a static second device public key and a static first device private key in the memory;
   determining to communicate with the second computing device;
   based on the determining, retrieving the static second device public key and the static first device private key from the memory;
   determining a first key pair comprising an ephemeral first device public key and an ephemeral first device private key;
   generating a first shared secret using the ephemeral first device private key and the static second device public key;
   receiving request data;
   obtaining encrypted request data by encrypting the request data using the first shared secret;
   sending a request message including the encrypted request data and the ephemeral first device public key to the second computing device;
   receiving a response message including encrypted response data and an ephemeral second device public key from the second computing device;
   generating a session key using the ephemeral first device private key, the static second device public key, the static first device private key, and the ephemeral second device public key, wherein generating the session key comprises:
      generating a second shared secret using the ephemeral first device private key and the static second device public key; and
      generating an auxiliary shared secret using the ephemeral second device public key and the static first device private key, wherein the generation of the session key uses the auxiliary shared secret and the second shared secret;
   obtaining response data by decrypting the encrypted response data using the session key, wherein the response data includes a payment credential; and
   conducting a payment transaction using the payment credential.

2. The system of claim 1, wherein the request data includes identification data corresponding to the first computing device or a user.

3. The system of claim 1, wherein the ephemeral first device public key is a combined ephemeral public key, wherein the ephemeral first device private key is a combined ephemeral private key, and wherein the instructions, when executed on the processor, further perform:
   determining the combined ephemeral public key and the combined ephemeral private key using an identification factor generated using identification data and authentication data.

4. The system of claim 1, wherein the instructions, when executed on the processor, further perform:
   generating another shared session key and another second device public key using the ephemeral first device private key and the ephemeral second device public key; and
   associating the other second device public key with the other shared session key, wherein the other shared session key is used to decrypt subsequent encrypted response data received from the second computing device.

5. The system of claim 1, wherein the static second device public key is blinded.

6. The system of claim 1, wherein the ephemeral second device public key is blinded.

7. The system of claim 1, further comprising:
   the second computing device, wherein the second computing device is configured to:
      receive, from the first computing device, the request message and the ephemeral first device public key;
      generate the first shared secret using the ephemeral first device public key and a static second device private key;
      decrypt the encrypted request data using the first shared secret to obtain the request data;
      determine a second key pair comprising the ephemeral second device public key and an ephemeral second device private key;
      generate a second session key using the ephemeral first device public key, the static second device private key, a blinded static first device public key, and the ephemeral second device private key;
      obtain the encrypted response data by encrypting the response data using the second session key; and
      send, to the first computing device, the response message.

8. A computer-implemented method for a first computing device for communicating with a second computing device, the method comprising:
   storing, a static second device public key and a static first device private key in a memory;
   determining to communicate with the second computing device;
   based on the determining, retrieving the static second device public key and the static first device private key from the memory;
   determining a key pair comprising an ephemeral first device public key and an ephemeral first device private key;
   generating a first shared secret using the ephemeral first device private key and the static second device public key;
   receiving request data;
   obtaining encrypted request data by encrypting the request data using the first shared secret;

sending a request message including the encrypted request data and the ephemeral first device public key to the second computing device;
receiving a response message including encrypted response data and an ephemeral second device public key from the second computing device;
generating a session key using the ephemeral first device private key, the static second device public key, the static first device private key, and the ephemeral second device public key, wherein generating the session key comprises:
generating a second shared secret using the ephemeral first device private key and the static second device public key; and
generating an auxiliary shared secret using the ephemeral second device public key and the static first device private key, wherein the generation of the session key uses the auxiliary shared secret and the second shared secret;
obtaining response data by decrypting the encrypted response data using the session key, wherein the response data includes a payment credential; and
conducting a payment transaction using the payment credential.

9. The computer-implemented method of claim 8, wherein the request data includes identification data corresponding to the first computing device or a user.

10. The computer-implemented method of claim 8, wherein the ephemeral first device public key is a combined ephemeral public key, wherein the ephemeral first device private key is a combined ephemeral private key, the method further comprising:
determining, by the first computing device, the combined ephemeral public key and the combined ephemeral private key using an identification factor generated using identification data and authentication data.

11. The computer-implemented method of claim 8 further comprising:
generating another shared session key and another second device public key using the ephemeral first device private key and the ephemeral second device public key; and
associating the other second device public key with the other shared session key, wherein the other shared session key is used to decrypt subsequent encrypted response data received from the second computing device.

12. The computer-implemented method of claim 8, wherein the static second device public key is blinded.

13. The computer-implemented method of claim 8, wherein the ephemeral second device public key is blinded.

14. A computer-implemented method for a second computing device for communicating with a first computing device, the method comprising:
receiving, from the first computing device, a request message including an ephemeral first device public key and encrypted request data;
generating a first shared secret using the ephemeral first device public key and a static second device private key;
decrypting the encrypted request data using the first shared secret to obtain request data;
determining a key pair comprising an ephemeral second device public key and an ephemeral second device private key;
generating a session key using the ephemeral first device public key, the static second device private key, a static first device public key, and the ephemeral second device private key, wherein generating the session key comprises:
generating a second shared secret using the ephemeral second device private key and the static first device public key; and
generating an auxiliary shared secret using the ephemeral first device public key and the static second device private key, wherein the generation of the session key uses the auxiliary shared secret and the second shared secret;
obtaining encrypted response data by encrypting response data using the session key; and
sending, to the first computing device, a response message including the encrypted response data.

15. The computer-implemented method of claim 14, wherein the static first device public key is a blinded static first device public key.

16. The computer-implemented method of claim 15, wherein the request message further includes the blinded static first device public key.

17. The computer-implemented method of claim 14, wherein the ephemeral first device public key is a combined ephemeral public key, wherein the request data includes an original ephemeral public key used to generate the combined ephemeral public key, wherein the request data further includes identification data, and wherein the computer-implemented method further comprises:
retrieving second authentication data from a device database using the identification data;
generating a second identification factor using the second authentication data and the identification data;
determining a second combined ephemeral public key using the second identification factor and the original ephemeral public key; and
comparing the combined ephemeral public key to the second combined ephemeral public key, wherein the first computing device is authenticated if the combined ephemeral public key and the second combined ephemeral public key match.

* * * * *